United States Patent [19]

Kato et al.

[11] Patent Number: 4,840,263
[45] Date of Patent: Jun. 20, 1989

[54] HYDRAULIC CONTROL DEVICE FOR 4WD TORQUE DISTRIBUTION CLUTCH PROVIDING STABILIZED PRESSURE CHARACTERISTICS

[75] Inventors: Nobuyuki Kato; Tokuyuki Takahashi; Hiroshi Itoh, all of Toyota, Japan

[73] Assignee: Toyota Jidosha Kabushiki Kaisha, Aichi, Japan

[21] Appl. No.: 95,883

[22] Filed: Sep. 14, 1987

[30] Foreign Application Priority Data

Oct. 6, 1986 [JP] Japan .................................. 61-237631
Oct. 23, 1986 [JP] Japan .................................. 61-252229

[51] Int. Cl.$^4$ .......................... F16D 25/14; B60K 17/34
[52] U.S. Cl. .................................... 192/109 F; 180/233
[58] Field of Search ................ 192/109 F, 85 R, 3.58; 180/233, 247

[56] References Cited

U.S. PATENT DOCUMENTS

| | | | |
|---|---|---|---|
| 4,161,895 | 7/1979 | Ushijima et al. | 192/109 F X |
| 4,289,221 | 9/1981 | Chambers et al. | 192/109 F X |
| 4,506,773 | 3/1985 | Schott | 192/109 F X |
| 4,697,479 | 10/1987 | Hayakawa et al. | 74/867 |
| 4,709,792 | 12/1987 | Sakai et al. | 192/109 F X |
| 4,715,467 | 12/1987 | Sakai | 74/866 X |

FOREIGN PATENT DOCUMENTS

| | | |
|---|---|---|
| 58-20521 | 2/1983 | Japan . |
| 60-176827 | 9/1985 | Japan . |
| 62-139722 | 6/1987 | Japan . |

*Primary Examiner*—Rodney H. Bonck

*Attorney, Agent, or Firm*—Oliff & Berridge

[57] ABSTRACT

A hydraulically actuated clutch is included in a four wheel drive device included in a vehicle power train, and is utilized for torque distribution between the front vehicle wheels and the rear vehicle wheels. A hydraulic control device for this torque distribution clutch includes a device for producing a control hydraulic fluid pressure for this clutch according to an oscillatory method such as a duty factor method or a dither method, an output conduit for conducting this control hydraulic fluid pressure out from this device for producing it, and a device for smoothing hydraulic pressure fluctuations in this output conduit. Accordingly, when wobbling or relatively small fluctuations tend to be induced in this control hydraulic fluid pressure in this output conduit, as may typically be caused by the oscillatory nature of the process for producing this control hydraulic fluid pressure, these wobbles and fluctuations are smoothed out by the smoothing device, thus making for smoother control of the control pressure for the clutch. Thereby, the engagement pressure of the clutch and hence the torque transmission capacity thereof are properly stabilized, and the torque distribution between the front wheels of the vehicle and the rear wheels of the vehicle is prevented from fluctuating, accordingly enhancing the drivability and the operational feeling of the vehicle, as well as decreasing tire wear and increasing roadability. This device for smoothing hydraulic pressure fluctuations may be a hydraulic accumulator; and the device for producing a control hydraulic fluid pressure may be an electromagnetic valve.

10 Claims, 8 Drawing Sheets

HYDRAULIC CONTROL DEVICE FOR 4WD TORQUE DISTRIBUTION CLUTCH PROVIDING STABILIZED PRESSURE CHARACTERISTICS

BACKGROUND OF THE INVENTION

The present invention relates to a hydraulic control device for a torque distribution clutch fitted to a four wheel drive device for a vehicle such as an automobile or the like, and more particularly relates to such a hydraulic control device for such a 4WD torque distribution clutch, said 4WD torque distribution clutch providing selective redistribution of torque between the front wheels of the vehicle and the rear wheels of the vehicle, with said hydraulic control device being capable of providing improved clutch pressure control characteristics.

Nowadays a greatly increasing number of automotive vehicles are being constructed with four wheel drive transmission systems, because such four wheel drive operation, in which all four wheels of the vehicle can be or are powered from its engine via its transmission, is very suitable for driving on poor or slippery road surfaces such as in mud or over bad ground, or upon roads covered with mud, snow, ice, or rain. In other words, four wheel drive operation provides a much higher degree of stability and drivability for the vehicle in conditions where the coefficient of friction between the wheels and the surface upon which the vehicle is being operated is relatively low. Also, four wheel drive operation is beneficial for aiding with hill climbing characteristics and high speed stability characteristics. Therefore, the four wheel drive type of transmission system is becoming more and more popular.

Generally speaking, there are two types of four wheel drive transmission system which are used in practice.

In the first of these two types of four wheel drive transmission system, i.e. in the so called part time type of four wheel drive transmission system, there is provided a two wheel drive/four wheel drive control clutch which selectably either rotationally couples together a drive member for driving the front wheels of the vehicle and a drive member for driving the rear wheels of the vehicle, or alternatively leaves said front wheels drive member and said rear wheels drive member rotationally disengaged from one another. One of said front wheels drive member and said rear wheels drive member is always rotationally driven by the engine of the vehicle via the transmission thereof, and thus, by selective engagement of said two wheel drive/-four wheel drive control clutch, the other one of said front wheels drive member and said rear wheels drive member selectably either is rotationally driven by the engine of the vehicle, or is allowed to rotate without being so driven by said engine. Thereby, either four wheel drive vehicle operation or two wheel drive operation is made available for the vehicle. Thus, this two wheel drive/four wheel drive control clutch may be termed a 4WD torque distribution clutch.

On the other hand, in the second of these two types of four wheel drive transmission system, i.e. in the so called full time type of four wheel drive transmission system, there is provided a central differential device, which receives input rotational power from the engine of the vehicle via the transmission thereof, and which always provides said rotational power both to a drive member for driving the front wheels of the vehicle and also to a drive member for driving the rear wheels of the vehicle, with differential action being provided between said front wheels drive member and said rear wheels drive member in a per se known manner. Thus, both said front wheels drive member and also said rear wheels drive member are always rotationally driven by the engine of the vehicle via the transmission thereof and via this central differential device. Such a central or front—rear differential device is typically provided in order to provide a differential action between the front wheels of the vehicle (considered as a pair) and the rear wheels of the vehicle (also considered as a pair) when the vehicle is turning around a curve, in order to eliminate the possibility of the occurrence of the so called tight corner braking phenomenon created by the difference in the turning radiuses of the front wheels of the vehicle and the rear wheels thereof (and also for various other reasons). And such provision of such a central or front—rear differential device is effective for achieving this result. Further, a central differential control clutch is often per se conventionally provided to this central differential device. According to a control signal such as a control hydraulic pressure which it receives, such a central differential control clutch rotationally couples together to a greater or lesser extent two out of the three rotational power input and output members of this central differential device, so as to allow said central differential device to provide its differential effect as explained above correspondingly to a greater or to a lesser extent. In other words, selectably: when this central differential control clutch is disengaged, it allows said central differential device substantially freely to provide its differential action as explained above; but, when this central differential control clutch is engaged to a greater or to a lesser extent, according to the degree of its engagement, it couples together the rotation of said front wheels drive member and the rotation of said rear wheels drive member, either only somewhat, or absolutely. Accordingly, such a central differential control clutch serves for regulating the distribution of the drive torque produced by the engine of the vehicle between the rear wheels of the vehicle (taken as a combination) and the front wheels of the vehicle (taken as a combination). Thereby, either four wheel drive vehicle operation, or two wheel drive operation, or an intermediate form of operation therebetween, is made available for the vehicle. Such a central differential control clutch or central differential action restriction means is typically provided for the following reason. If even one of the vehicle wheels slips, which may well occur especially when the vehicle is being operated upon a bad road surface such as when it is raining, it is snowing, or when the road is muddy, drive power will be lost, whereupon there is the problem that because of the differential effect of the central differential device the drive power of all wheels will be reduced, and the so called trailblazability of the vehicle will be severely deteriorated. In, therefore, a four wheel drive device having a central differential device, such a differential restriction device is typically provided, and is typically operated according to vehicle operational conditions. Again, this central differential control clutch may be termed a 4WD torque distribution clutch.

Various proposals for strategies for qualitative control of the engagement state of such a 4WD torque distribution clutch, according to various operational conditions, have been made in various prior arts. And proposals for controlling such a 4WD torque distribution clutch have been put forward, for example, in Japanese Patent Application Laying Open Publication Ser. No. 58-20521 (1983), in Japanese Patent Application Laying Open Publication Ser. No. 60-176827 (1985), and in Japanese Patent Application Laying Open Publication Ser. No. 62-139722 (1987), all of which were filed by an applicant the same as the entity owed duty of assignment of the present patent application, and none of which is it hereby intended to admit as prior art to the present patent application except to the extent in any case mandated by applicable law. Such a 4WD torque distribution clutch is typically of a hydraulic type which is powered by a hydraulically operated servo device, so that the engagement pressure of said 4WD torque distribution clutch, i.e. the maximum amount of torque that said 4WD torque distribution clutch can transmit, which defines the amount of torque distribution which said 4WD torque distribution clutch can provide between the rear wheels of the vehicle (taken as a combination) and the front wheels of the vehicle (taken as a combination), is regulated by the magnitude of an actuating hydraulic fluid pressure. And such an actuating hydraulic fluid pressure is typically provided by a control system such as a hybrid electrical/hydraulic control system which may include a microcomputer. In more detail, typically such an actuating hydraulic fluid pressure is typically provided by a control system which operates by duty ratio control or by dither control, the control being performed by such a microcomputer.

In more detail, controlling such an actuating hydraulic fluid pressure by duty ratio control is done by supplying a pulsed electrical signal of substantially constant pulse frequency to a solenoid or the like of an on/off type of electromagnetic fluid switching valve, and by varying the duty ratio of said pulsed electrical signal according to the pressure value which it is required that said valve should output. On the other hand, controlling such an actuating hydraulic fluid pressure by dither control is done by supplying an electrical signal such as a current signal to a linear type of electromagnetic fluid switching valve, thus (for example) controlling the opening amount of a drain port thereof, thereby varying the pressure value which said valve is outputting, and by causing this electrical signal somewhat to pulsate, so that the valve element of said valve constantly oscillates with a relatively very small amplitude about its desired position. Thereby, sticking of this valve element is prevented, and the responsiveness of the valve is enhanced.

With either of these control methods—either duty ratio control or dither control—if the line hydraulic fluid pressure of the transmission, which typically increases along with an increase in the load on the engine of the vehicle, is used directly as the source of hydraulic fluid pressure which is modulated by the electromagnetic fluid switching valve in order to provide the actuating hydraulic fluid pressure for the 4WD torque distribution clutch, then, although the hydraulic circuit is thereby rendered relatively simple, the problem arises that, since this base pressure which is modulated for controlling the 4WD torque distribution clutch varies, then, in the exemplary case of duty ratio control, even in the case of a fixed duty ratio of the controlling pulsed electrical signal, the actuating hydraulic fluid pressure for the 4WD torque distribution clutch varies along with these line pressure variations. Accordingly, the duty ratio of the controlling pulsed electrical signal is required to be compensated, in order to allow for the current value of the line pressure, and thereby the control of this duty factor becomes very complicated, and it becomes difficult to have accurate control of the actuating hydraulic fluid pressure for the 4WD torque distribution clutch.

In other words, when controlling the actuating hydraulic fluid pressure for the 4WD torque distribution clutch by duty ratio control of the pulsed electrical signal which is supplied to the electromagnetic fluid switching valve, the ratio of the servo pressure supplied to the duty ratio of said pulsed control signal will vary depending upon the current value of the line pressure of the transmission, and, since also the pressure which is being supplied to said electromagnetic valve is constantly varying, the pressure adjustment characteristics provided are not stabilized, and thereby the accuracy of the control of said actuating hydraulic fluid pressure is not good, and moreover it is required that the electromagnetic fluid switching valve should be of a high pressure type so that it can definitely tolerate the maximum conceivable value of line pressure, which means that the electromagnetic fluid switching valve is required to be relatively complicated and relatively large.

Another problem that has occurred with respect to the prior art and with respect to the constructions detailed above is that, with either of these control methods for the electromagnetic fluid switching valve—either duty ratio control or dither control—either as the valve element opens and closes, or as the valve element wobbles to and fro about its desired position, as the case may be, fine fluctuations or fluttering in the output pressure of the electromagnetic fluid switching valve are caused, and this creates a wobbling or fluctuation in the hydraulic fluid pressure in the servo chamber of the 4WD torque distribution clutch, which causes the engagement pressure of said clutch and hence the torque transmission capacity thereof to be not properly stabilized, and accordingly the torque distribution between the front wheels of the vehicle and the rear wheels of the vehicle fluctuates finely but at high frequency, which deteriorates the drivability and the operational feeling of the vehicle, as well as increasing tire wear and reducing roadability.

SUMMARY OF THE INVENTION

The inventors of the present invention have considered the problems detailed above in the aforementioned type of hydraulic control device for a 4WD torque distribution clutch, and have considered various possibilities for improvement thereof.

Accordingly, it is the primary object of the present invention to provide an improved hydraulic control device for a 4WD torque distribution clutch, which avoids the problems detailed above.

It is a further object of the present invention to provide such a 4WD torque distribution clutch hydraulic control device, which can provide relatively highly accurate control of said 4WD torque distribution clutch.

It is a further object of the present invention to provide such a 4WD torque distribution clutch hydraulic control device, which allows of relatively simple duty ratio or dither control.

It is a further object of the present invention to provide such a 4WD torque distribution clutch hydraulic control device, which has stable operational characteristics.

It is a further object of the present invention to provide such a 4WD torque distribution clutch hydraulic control device, which is not disturbed, with regard to its control function, by variation of the transmission line hydraulic fluid pressure.

It is a yet further object of the present invention to provide such a 4WD torque distribution clutch hydraulic control device, which is not subject to fluctuations of a hydraulic control pressure which it produces.

It is a yet further object of the present invention to provide such a 4WD torque distribution clutch hydraulic control device, which controls said 4WD torque distribution clutch to be engaged to an amount which is stabilized.

It is a yet further object of the present invention to provide such a 4WD torque distribution clutch hydraulic control device, which provides good drivability and road feeling for a vehicle to which it is fitted.

It is a yet further object of the present invention to provide such a 4WD torque distribution clutch hydraulic control device, which provides good tire wear characteristic and roadability for a vehicle to which it is fitted.

According to the most general aspect of the present invention, these and other objects are attained by, for a hydraulically actuated torque distribution clutch comprised in a four wheel drive device comprised in a power train of an automotive vehicle: a hydraulic control device, comprising: (a) a means for producing a control hydraulic fluid pressure for said torque distribution clutch, according to an oscillatory method; (b) an output conduit for conducting said control hydraulic fluid pressure from said producing means therefor; and: (c) a means for smoothing hydraulic pressure fluctuations in said output conduit.

According to such a 4WD torque distribution clutch hydraulic control device as described above, when wobbling or relatively small fluctuations tend to be induced in the control hydraulic fluid pressure in the output conduit, as may typically be caused by the oscillatory nature of the process for producing the control hydraulic fluid pressure, these wobbles and fluctuations are smoothed out by the smoothing means therefor, thus making for smoother control of the control pressure for the 4WD torque distribution clutch. Thereby, the engagement pressure of the 4WD torque distribution clutch and hence the torque transmission capacity thereof are properly stabilized, and the torque distribution between the front wheels of the vehicle and the rear wheels of the vehicle is prevented from fluctuating, accordingly enhancing the drivability and the operational feeling of the vehicle to which this device is fitted, as well as decreasing the tire wear and increasing the roadability thereof.

The oscillatory method used for producing the control hydraulic fluid pressure may be a duty factor method, or may be a dither method; and the means for smoothing hydraulic pressure fluctuations may be a hydraulic accumulator, and the means for producing a control hydraulic fluid pressure may be an electromagnetic valve.

And, according to a particular specialization of the present invention, the above and other objects may more particularly be accomplished by such a 4WD torque distribution clutch hydraulic control device as first specified above, wherein said control hydraulic fluid pressure for said torque distribution clutch is directly fed to a pressure chamber of said torque distribution clutch as an actuating hydraulic fluid pressure. In this case, the system is simple. However, as an alternative, according to another particular specialization of the present invention, the above and other objects may more particularly be accomplished by such a 4WD torque distribution clutch hydraulic control device as first specified above, further comprising a clutch control means for receiving said control hydraulic fluid pressure and for producing an output hydraulic fluid pressure which is fed to a pressure chamber of said torque distribution clutch as an actuating hydraulic fluid pressure, the pressure magnitude of said output hydraulic fluid pressure varying according to the pressure magnitude of said control hydraulic fluid pressure. Optionally, this clutch control means may comprise a hydraulic valve; and, optionally, the means for producing said control hydraulic fluid pressure may comprise a means for producing a substantially constant hydraulic pressure, and a means for regulating said substantially constant hydraulic pressure according to the particular oscillatory method utilized, possibly duty factor or dither and possibly executed by an electromagnetic valve, so as to produce said control hydraulic fluid pressure. Optionally but desirably, said clutch control means may vary the pressure magnitude of said output hydraulic fluid pressure substantially linearly with respect to the pressure magnitude of said control hydraulic fluid pressure at least over certain corresponding ranges thereof; and, more particularly, in such a case said clutch control means may vary the pressure magnitude of said output hydraulic fluid pressure substantially linearly with respect to the pressure magnitude of said control hydraulic fluid pressure, as said control hydraulic fluid pressure varies over a range from a relatively low pressure value up to a certain threshold pressure value; and may, when said control hydraulic fluid pressure increases to be greater than said certain threshold pressure value, set the pressure magnitude of said output hydraulic fluid pressure to be a maximum value. In this case, this maximum value of said pressure magnitude of said output hydraulic fluid pressure may be set to be greater, the greater is the load upon a power source comprised in said power train of said automotive vehicle; and, further or alternatively, may be substantially larger than the limit value to which said pressure magnitude of said output hydraulic fluid pressure approaches as said pressure magnitude of said control hydraulic fluid pressure approaches said certain threshold pressure value thereof. As will be explained hereinafter, these concepts increase the fineness of the control which may be exercised over the torque distribution clutch.

BRIEF DESCRIPTION OF THE DRAWINGS

The present invention will now be described with respect to the preferred embodiments thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference symbols, unless otherwise so specified, denote the same parts and gaps and spaces and chambers and so on in the various figures relating to one preferred embodiment, and like parts and gaps and spaces and chambers and so on in figures relating to different preferred embodiments; and:

DESCRIPTION OF THE PREFERRED EMBODIMENTS

The present invention will now be described with reference to the preferred embodiments thereof, and with reference to the figures.

Exemplary Overall Vehicle Power Train Structures

Figure 1:
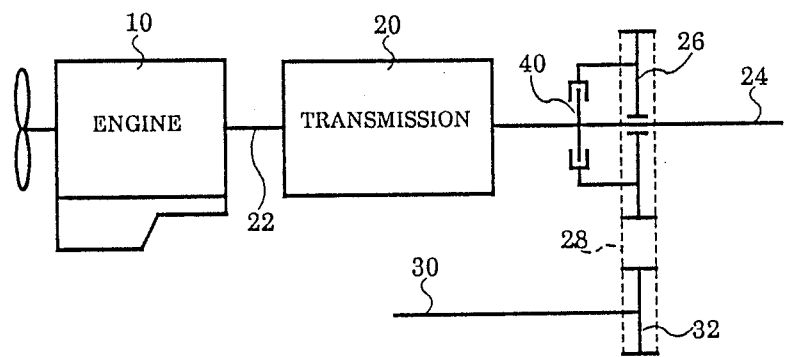
FIG. 1 is a schematic longitudinal skeleton view of a first possible transmission system for a four wheel drive type vehicle, to which the various preferred embodiments of the 4WD torque distribution clutch hydraulic control device of the present invention may be applied.

FIG. 1 is a schematic longitudinal skeleton view of a first possible transmission system for a four wheel drive type vehicle, to which the various preferred embodiments of the 4WD torque distribution clutch hydraulic control device of the present invention may be applied. In this figure, the reference numeral 10 denotes an internal combustion engine of the vehicle, and this engine 10 drives, via a transfer shaft 22 which may be the crank shaft of said engine 10, a transmission mechanism 20 which may be of a per se conventional type. In this first exemplary case, the power output shaft 24 of this transmission mechanism 20 extends towards the rear of the vehicle and its right end in the sense of the figure (not particularly shown) directly drives, via a differential device or the like not shown in the figures, the rear wheels of the vehicle taken as a combination. At an intermediate point on said power output shaft 24 there is rotatably mounted a power transfer gear wheel 26, and an endless chain or belt 28 is fitted around said transfer gear wheel 26 and around a front wheels drive gear wheel 32. This front wheels drive gear wheel 32 is fixedly mounted, in a substantially coplanar fashion with the power transfer gear wheel 26, on the end of a front wheels drive shaft 30, which itself is rotatably mounted substantially parallel to the power output shaft 24, and the left end of which in the figure (also not particularly shown) directly drives, via a differential device or the like likewise not shown in the figures, the front wheels of the vehicle taken as a combination. And a 2WD/4WD switchover clutch 40 is fitted to act between the power output shaft 24 and the power transfer gear wheel 26. Thus, when hydraulic fluid pressure of a suitable pressure value is being supplied to an actuating chamber of said 2WD/4WD switchover clutch 40 (which is not shown in detail because the construction of the 2WD/4WD switchover clutch 40 may be of a per se conventional type), then said 2WD/4WD switchover clutch 40 is engaged, and the rotational power which is being generated by the engine 10 is transmitted, via the transmission mechanism 20, to the rear wheels of the vehicle via the power output shaft 24, and also to the front wheels of the vehicle via the power output shaft 24, the 2WD/4WD switchover clutch 40, the power transfer gear wheel 26, the endless chain or belt 28, the front wheels drive gear wheel 32, and the front wheels drive shaft 30. On the other hand, when no such hydraulic fluid pressure is being supplied to said actuating chamber of said 2WD/4WD switchover clutch 40, then said 2WD/4WD switchover clutch 40 is not engaged, and the rotational power which is being generated by the engine 10 and which as before is being transmitted, via the transmission mechanism 20, to the rear wheels of the vehicle via the power output shaft 24, is not transmitted at all to the front wheels of the vehicle, due to the free wheeling of said 2WD/4WD switchover clutch 40. And, in summary, the 2WD/4WD switchover clutch 40 is hydraulically operated, with hydraulic fluid pressure being supplied to a hydraulic servo chamber thereof, and its engagement pressure and accordingly the maximum degree of torque which it can transmit are increased along with increase in the magnitude of said supplied hydraulic fluid pressure.

Figure 2:
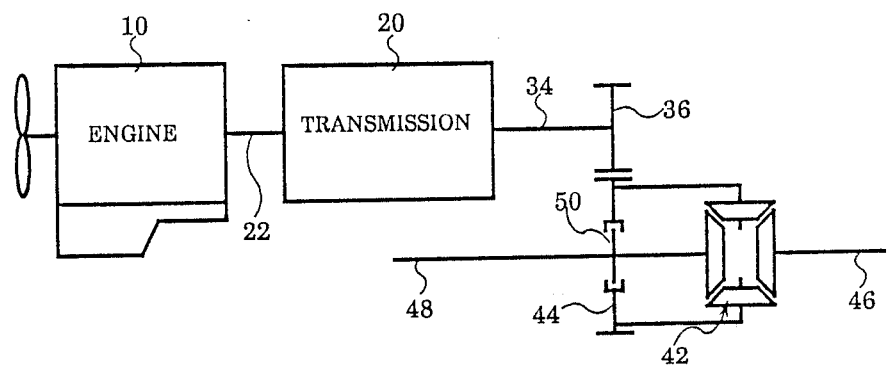
FIG. 2 is another schematic longitudinal skeleton view of a second possible transmission system for a four wheel drive type vehicle, to which, again, the various preferred embodiments of the 4WD torque distribution clutch hydraulic control device of the present invention may be applied.

FIG. 2 is another schematic longitudinal skeleton view of a second possible transmission system for a four wheel drive type vehicle, to which, again, the various preferred embodiments of the 4WD torque distribution clutch hydraulic control device of the present invention may be applied. In this figure, again, the reference numeral 10 denotes an internal combustion engine of the vehicle, and this engine 10 drives, via a transfer shaft 22 which may be the crank shaft of said engine 10, a transmission mechanism 20 which may be of a per se conventional type. In this second exemplary case, the power output shaft 34 of this transmission mechanism 20 extends towards the rear of the vehicle and on its right end in the sense of the figure there is fixedly mounted a power transfer gear wheel 36. This power transfer gear wheel 36 is constantly meshed with a crown gear wheel 44 of a central differential device 42, which may be of a per se conventional type including various bevel gears and the like as symbolically shown in the figure, and which provides rotational power thus supplied to its crown gear wheel 44 to a rear wheels power output shaft 46 and to a front wheels power output shaft 48, with differential action (if not interfered with) being provided between said rear wheels power output shaft 46 and said front wheels power output shaft 48 in a per se known fashion. The right end in the sense of the figure (not particularly shown) of the rear wheels power output shaft 46 directly drives, via a differential device or the like not shown in the figures, the rear wheels of the vehicle taken as a combination. And the left end in the sense of the figure (also not particularly shown) of the front wheels power output shaft 48 directly drives, via a differential device or the like also not shown in the figures, the front wheels of the vehicle taken as a combination. An intermediate portion of this front wheels power output shaft 48 is connected to a one selectively coupled member of a central differential control clutch 50, the other selectively coupled member of which is connected to the crown gear wheel 44 of the central differential device 42. Thus, when hydraulic fluid pressure of a suitable pressure value is being supplied to an actuating chamber of said central differential control clutch 50 (which is not shown in detail because the construction of said central differential control clutch 50 may be of a per se conventional type), then said central differential control clutch 50 is engaged, and the rotational power which is being generated by the engine 10 is transmitted, via the transmission mecha-nism 20 and the power output shaft 34 thereof, and via the central differential device 42, to the rear wheels of the vehicle via the rear wheels power output shaft 46, and also to the front wheels of the vehicle via the front wheels power output shaft 48; and at this time the central differential device 42 provides no substantial differential effect between the front wheels of the vehicle (taken as a combination) and the rear wheels of the vehicle (likewise taken as a combination), due to the fact that the central differential control clutch 50 is in its locked up state. On the other hand, when no such hydraulic fluid pressure is being supplied to said actuating chamber of said central differential control clutch 50, then said central differential control clutch 50 is not engaged, and the rotational power which is being generated by the engine 10 is transmitted, via the transmission mechanism 20 and the power output shaft 34 thereof, and via the central differential device 42, to the rear wheels of the vehicle via the rear wheels power output shaft 46, and also to the front wheels of the vehicle via the front wheels power output shaft 48; and at this time the central differential device 42 provides its differential effect between the front wheels of the vehicle (taken as a combination) and the rear wheels of the vehicle (likewise taken as a combination), due to the fact that the central differential control clutch 50 is not in its locked up state, i.e. due to the free wheeling of said central differential control clutch 50. And, in summary as before, the central differential control clutch 50 is hydraulically operated, with hydraulic fluid pressure being supplied to a hydraulic servo chamber thereof, and its engagement pressure and accordingly the maximum degree of torque which it can transmit are increased along with increase in the magnitude of said supplied hydraulic fluid pressure.

The First Preferred Embodiment

Figure 3:
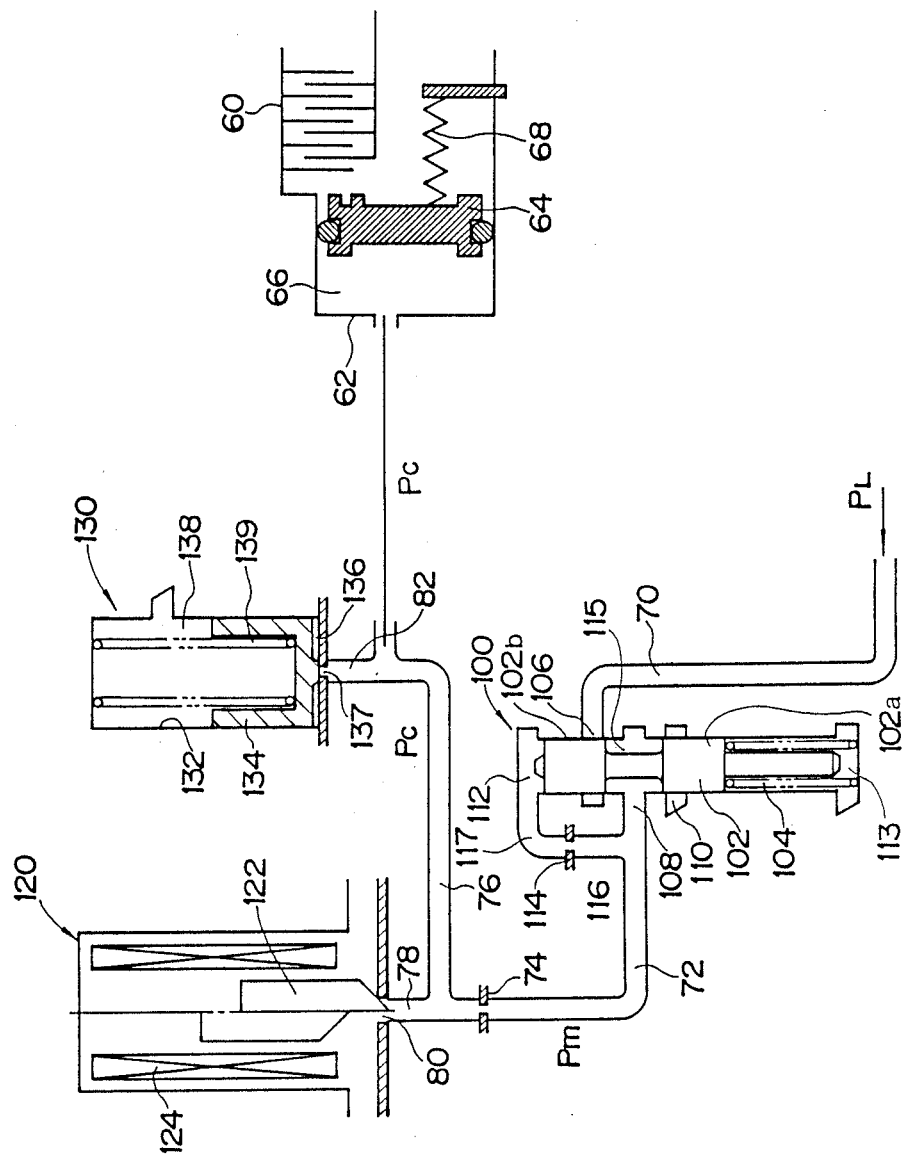
FIG. 3 is a schematic partial sectional view showing the first preferred embodiment of the 4WD torque distribution clutch hydraulic control device of the present invention, and also partly shows a 4WD torque distribution clutch which is being controlled by said first preferred embodiment.

In FIG. 3, there is shown a schematic partial sectional view of the first preferred embodiment of the 4WD torque distribution clutch hydraulic control device of the present invention, and also there is partially shown a 4WD torque distribution clutch which is being controlled by said first preferred embodiment.

In this figure, the 4WD torque distribution clutch is generally designated by the reference numeral 60; and this 4WD torque distribution clutch 60, in a particular application, can be the 2WD/4WD switchover clutch 40 of the transmission system shown in FIG. 1, or can be the central differential control clutch 50 of the transmission system shown in FIG. 2, or alternatively can be yet a different form of 4WD torque distribution clutch. This 4WD torque distribution clutch 60, in this exemplary application, is in fact a hydraulic servo type multi plate type wet clutch, and comprises two sets of mutually interleaved and sandwiched together clutch plates, one of said clutch plates sets being rotationally fixed with respect to a first one of the two members which this 4WD torque distribution clutch 60 selectively rotationally couples together (said members not being particularly shown), while the other said set of clutch plates are rotationally fixed with respect to the other one of said two members which this 4WD torque distribution clutch 60 selectively rotationally couples together. Thus, when these two sets of clutch plates are squeezed together by a servo device 62 therefor as will be explained in detail shortly, a maximum torque transmission capability between said two members which this 4WD torque distribution clutch 60 selectively rotationally couples together is provided in a degree corresponding to the degree of squeezing together of said two sets of clutch plates, i.e. in a degree corresponding to the total force acting to squeeze the sandwich of said sets of clutch plates together.

The hydraulic servo device 62 provided for thus pressing and squeezing together said sets of clutch plates comprises a pressure chamber 66 and a servo piston 64, all of these members and chambers being annular although only a partial sectional view thereof is shown in the figure. The servo piston 64 confronts the two sandwiched together sets of clutch plates, for opposing said clutch plate sets and for pressing them together, when said servo piston 64 is biased in the direction towards said clutch plate sets (rightwards in FIG. 3). And, when the pressure chamber 66 is pressurized with hydraulic fluid, it presses the servo piston 64 against the clutch plate sets in this way, and squeezes them together. A spring 68, which in fact is an annular spring and which bears against a spring retainer member, is provided for biasing said servo piston 64 in the leftwards direction as seen in FIG. 3, so as to reduce the volume of the pressure chamber 66. Thereby, when no substantial hydraulic fluid pressure is supplied to said pressure chamber 66, under the biasing action of the spring 68 the servo piston 64 is biased in the leftwards direction as seen in the drawing, so as not to substantially compress together the superposed sandwich of the clutch plate sets and so as thus to let said clutch plate sets be not substantially mutually engaged; and, thereby, no substantial degree of torque transmission between the two members which this 4WD torque distribution clutch 60 selectively rotationally couples together is provided. On the other hand, when a substantial degree of hydraulic fluid pressure, denoted as Pc in the figure, is supplied to the pressure chamber 66, the servo piston 64 is biased, against the biasing action of the spring 68 which is overcome, in the rightwards direction as seen in the drawing, so that said servo piston 64 presses against and compresses together the superposed sandwich of the clutch plate sets with a force determined according to the magnitude of the pressure value supplied to said pressure chamber 66, thereby causing said clutch plate sets to be mutually engaged together with a maximum torque transmission capability which is determined according to said magnitude of said hydraulic fluid pressure value supplied to said pressure chamber 66; and, thereby, a maximum torque transmission capability is provided between the two members which this 4WD torque distribution clutch 60 selectively rotationally couples together, similarly with a maximum torque transmission magnitude determined according to the magnitude of the pressure value supplied to the pressure chamber 66.

The arrangements according to the first preferred embodiment of the 4WD torque distribution clutch hydraulic control device of the present invention for supplying the control hydraulic fluid pressure Pc to this pressure chamber 66 of this hydraulic servo device 62, for thus engaging the 4WD torque distribution clutch 60 as desired, will now be explained.

From a per se conventional source of line hydraulic fluid pressure not shown in the figure, hydraulic fluid pressurized to a line pressure P1 is supplied to one end not shown of a conduit 70, the other end of which opens to an input port 106 of a pressure setting valve 100. This pressure setting valve 100 is structured as a spool valve, and comprises a valve element 102 which slides longitudinally within a bore formed in a housing. This valve element 102 is structured with two land portions designated as 102a and 102b, and a spring chamber 113 is defined between the land 102a and the end of the valve bore in the longitudinal direction of said land 102a (the lower end of said valve bore in FIG. 3), while an intermediate chamber 115 is defined between the land 102b and the land 102a, and a control pressure chamber 112 is defined between the land 102b and the end of the valve bore in the longitudinal direction of said land 102b (the upper end of said valve bore in FIG. 3). A compression coil spring 104 is provided within the spring chamber 113 between the land 102a and the lower end in the figure of the valve bore, and thus biases the valve element 102 in the upward direction in the figure, so as to diminish the volume of the control pressure chamber 112. An output port 108 of this pressure setting valve 100 opens at a position in the side of the valve bore thereof so as to be always communicated to the intermediate chamber 115, whatever be the position of the valve element 102 in the valve bore, and to this output port 108 there is connected an output conduit 72 for this valve 100. To an intermediate position on this output conduit 72 there is connected a conduit 117, which leads the pressure in said output conduit 72 to the control pressure chamber 112, and midway along said conduit 117 there is located a throttling device 114. And the position of the input port 106 of this pressure setting valve 100 along the valve bore thereof is so arranged that, when the valve element 102 is in a somewhat downwardly displaced position in said valve bore as shown in the figure, then said input port 106 is cut off from communication with the intermediate chamber 115, thus completely discommunicating the line pressure P1 in the conduit 70 from the output conduit 72 and from the control pressure chamber 112; but, when said valve element 102 is in a more upwardly displaced position in said valve bore from its position as shown in the figure, then said input port 106 is progressively more and more put into communication with the intermediate chamber 115, thus progressively more and more communicating the line pressure P1 in the conduit 70 to the output conduit 72 and to the control pressure chamber 112.

By this construction a clutch modulate pressure Pm is established in the output conduit 72, according to the action that, when the hydraulic fluid pressure in said output conduit 72 drops substantially below said clutch modulate pressure Pm, after a certain determinate time period (determined by the throttling characteristics of the throttling device 114), then the hydraulic fluid pressure in the control pressure chamber 112 drops, so that the valve element 102 shifts somewhat upwards as seen in the figure due to the biasing action of the compression coil spring 104, thereby increasing the amount of communication provided by the port 106 past the land 102b of said valve element 102 and causing the hydraulic fluid pressure in said output conduit 72 thereafter to be raised according to increase of supply of line hydraulic fluid pressure P1 to said output conduit 72 from the conduit 70 via the intermediate chamber 115. On the other hand, when the hydraulic fluid pressure in the output conduit 72 rises substantially above said clutch modulate pressure Pm, after a similar certain determinate time period, then the hydraulic fluid pressure in the control pressure chamber 112 rises, so that the valve element 102 shifts somewhat downwards as seen in the figure against the biasing action of the compression coil spring 104 which is overcome, thereby decreasing the amount of communication provided by the port 106 past the land 102b of said valve element 102 and causing the hydraulic fluid pressure in said output conduit 72 thereafter to be dropped according to decrease of supply of line hydraulic fluid pressure P1 to said output conduit 72 from the conduit 70 via the intermediate chamber 115. According to a balance of these two effects, therefore, by a feedback process, a substantially constant clutch modulate pressure Pm is provided by the pressure setting valve 100 within the output conduit 72, said clutch modulate pressure Pm being determined by the spring characteristics of the compression coil spring 104 and by other fixed physical characteristics of the pressure setting valve 100, and being substantially lower than the line pressure P1.

The output conduit 72 leads, via a throttling element 74, to a conduit 76, which in its turn leads to the pressure chamber 66 of the hydraulic servo device 62 for the 4WD torque distribution clutch 60. However, to a first intermediate point of said conduit 76, between said throttling element 74 and the downstream end of said conduit 76 which is thus communicated to said pressure chamber 66, there is branched off a conduit 78 which leads to an electromagnetic drain valve 120, and further to a second intermediate point of said conduit 76, between said first intermediate point thereof and said downstream end thereof, there is branched off another conduit 82 which leads to an accumulator type hydraulic fluid pressure damper device 130. The actions of these two devices, i.e. of the electromagnetic drain valve 120 and of the hydraulic fluid pressure damper device 130, for regulation and control of the control hydraulic fluid pressure Pc supplied to the pressure chamber 66 of the hydraulic servo device 62 for the 4WD torque distribution clutch 60, will now be explained.

The electromagnetic drain valve 120 is of a drain port open/close type, and comprises a valve element 122 which has an end portion fashioned in a conical shape which interacts with a drain port 80 positioned at the end of the branch conduit 78. The valve element 122 is driven to and fro in its longitudinal direction by a solenoid device 124 and by an opposing biasing means not shown in the figure. Thus, when actuating electrical energy is being supplied to said solenoid device 124, i.e. when said solenoid device 124 is in the ON state, against the biasing action of the not shown biasing means which is overcome the valve element 122 is positioned to its position as shown on the left side of its central axis in the figure, and the tip of said valve element 122 is withdrawn from the drain port 80 and does not close said drain port 80, whereby the pressure in the conduit 76 is substantially completely drained, and the pressure supplied to the pressure chamber 66 of the hydraulic servo device 62 for the 4WD torque distribution clutch 60 is reduced. On the other hand, when no actuating electrical energy is being supplied to said solenoid device 124, i.e. when said solenoid device 124 is in the OFF state, under the biasing action of the not shown biasing means the valve element 122 is positioned to its position as shown on the right side of its central axis in the figure, and the tip of said valve element 122 is pressed against the drain port 80 and substantially closes said drain port 80, whereby the pressure in the conduit 76 is not substantially reduced, and the pressure supplied towards the pressure chamber 66 of the hydraulic servo device 62 for the 4WD torque distribution clutch 60 is not substantially interfered with.

Figure 4:
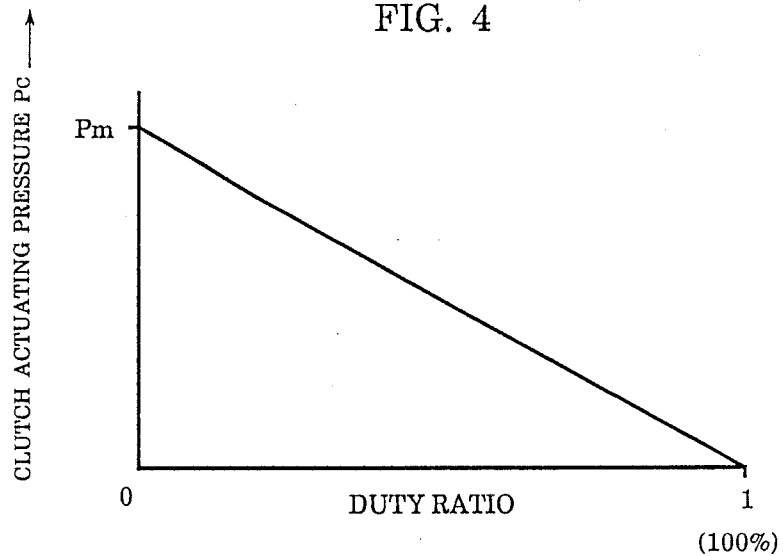
FIG. 4 is an exemplary and typical graph showing the variational behavior of an actuating pressure Pc (shown along the vertical axis) supplied to a pressure chamber of a hydraulic servo device for the 4WD torque distribution clutch of FIG. 3 as a control pressure therefor, with respect to the duty ratio (shown along the horizontal axis) of a pulse electrical signal supplied to a solenoid device included in the first preferred embodiment shown in that figure.

And the solenoid device 124 of this electromagnetic drain valve 120 is supplied from an electrical transmission control device, such as for example one incorporating a microcomputer, with a pulsed electrical signal of a substantially constant frequency and of a duty ratio which is determined according to the pressure which said electrical control device currently deems appropriate to be supplied to the pressure chamber 66 of the hydraulic servo device 62 for the 4WD torque distribution clutch 60. Thereby, the valve element 122 of said electromagnetic drain valve 120 opens and closes the drain port 80 with a corresponding duty ratio, so that a pressure is produced in the branch conduit 78, and a consequential pressure is produced in the conduit 76, appropriately determined as described above according to the pulse ratio of the electrical signal supplied to the solenoid device 124. In particular, when the duty ratio of the electrical signal supplied to the solenoid device 124 is zero, the valve element 122 is constantly positioned to its position as shown on the right side of its central axis in the figure, and the tip of said valve element 122 is constantly pressed against the drain port 80 and constantly substantially closes said drain port 80, whereby the pressure in the conduit 76 and the pressure supplied towards the pressure chamber 66 of the hydraulic servo device 62 for the 4WD torque distribution clutch 60 are set to their maximum value, the previously described clutch modulate pressure Pm; and, to consider the other extreme, when the duty ratio of the electrical signal supplied to the solenoid device 124 is unity, the valve element 122 is constantly positioned to its position as shown on the left side of its central axis in the figure, and the tip of said valve element 122 is constantly withdrawn away from the drain port 80 and constantly opens said drain port 80, whereby the pressure in the conduit 76 and the pressure supplied towards the pressure chamber 66 of the hydraulic servo device 62 for the 4WD torque distribution clutch 60 are set to their minimum value, zero. And, as the duty ratio of the electrical signal supplied to the solenoid device 124 increases from zero, the valve element 122 is for more and more of the time positioned to its position as shown on the left side of its central axis in the figure, and the tip of said valve element 122 for more and more of the time is withdrawn away from the drain port 80 and thus for more and more of the time opens said drain port 80, whereby the pressure in the conduit 76 and the pressure supplied towards the pressure chamber 66 of the hydraulic servo device 62 for the 4WD torque distribution clutch 60 are steadily diminished. In other words, the pressure supplied towards the pressure chamber 66 of the hydraulic servo device 62 for the 4WD torque distribution clutch 60 as a control pressure therefor is a monotonically decreasing function of the duty ratio of the electrical signal supplied to the solenoid device 124, and is thereby determined by the electrical transmission control device, no particular example of which will be shown or discussed in this specification because it does not form a part of the present invention. FIG. 4 is an exemplary and typical graph showing the variational behavior of the actuating pressure Pc supplied to the pressure chamber 66 of the hydraulic servo device 62 for the 4WD torque distribution clutch 60 as a control pressure therefor, with respect to the duty ratio of the electrical signal supplied to the solenoid device 124, in this first preferred embodiment.

The hydraulic fluid pressure damper device 130 is connected to the branch conduit 82 which is communicated to a point on the conduit 76 downstream of the branch conduit 78 which leads to the electromagnetic drain valve 120. This hydraulic fluid pressure damper device 130 is of an accumulator type, and comprises a cylinder bore 132 within which there slides a damper piston 134. Between said damper piston 134 and the lower end in the figure of said cylinder bore 132 there is defined a hydraulic damper chamber 136, and a port 137 communicates said hydraulic damper chamber 136 to the branch conduit 82 which leads to the conduit 76. And between the damper piston 134 and the upper end in the figure of the cylinder bore 132 there is defined a spring chamber 138, within which there is fitted a compression coil spring 139, said compression coil spring 139 thus biasing the damper piston 134 within the cylinder bore 132 in the axial direction thereof to diminish the volume of the hydraulic damper chamber 136 and thus to expel hydraulic fluid through the port 137 towards the branch conduit 82.

Thus the pressure present within the conduit 76, which is being supplied to the pressure chamber 66 of the hydraulic servo device 62 for the 4WD torque distribution clutch 60 as the actuating hydraulic fluid pressure Pc for said 4WD torque distribution clutch 60, is also supplied to the hydraulic damper chamber 136 of the hydraulic fluid pressure damper device 130, and tends to increase the volume of said hydraulic damper chamber 136 by pushing the damper piston 134 upwards in its cylinder bore 132 against the biasing action of the compression coil spring 139 which is overcome; so that said damper piston 134 tends to find an intermediate position within said cylinder bore 132 by the balance between the pushing action of said pressure in said hydraulic damper chamber 136 and the biasing action of said compression coil spring 139, which naturally increases the more said compression coil spring 139 is compressed. Accordingly, when wobbling or the like relatively small fluctuations tend to be induced in said actuating hydraulic fluid pressure Pc for the 4WD torque distribution clutch 60 present within the conduit 76, which could, for example and typically, be caused by the oscillatory duty ratio action for modulating said pressure which is being performed by the electromagnetic drain valve 120, these wobbles and fluctuations are smoothed out by the damping or accumulator action of the hydraulic fluid pressure damper device 130 as described above, thus making for smoother control of said hydraulic fluid pressure Pc supplied to the pressure chamber 66 of the hydraulic servo device 62 for said 4WD torque distribution clutch 60 as an actuating pressure therefor. Thereby, the engagement pressure of said 4WD torque distribution clutch 60 and hence the torque transmission capacity thereof are properly stabilized, and accordingly the torque distribution between the front wheels of the vehicle and the rear wheels of the vehicle is prevented from fluctuating, accordingly enhancing the drivability and the operational feeling of the vehicle, as well as decreasing the tire wear and increasing the roadability thereof.

The Second Preferred Embodiment

Figure 5:
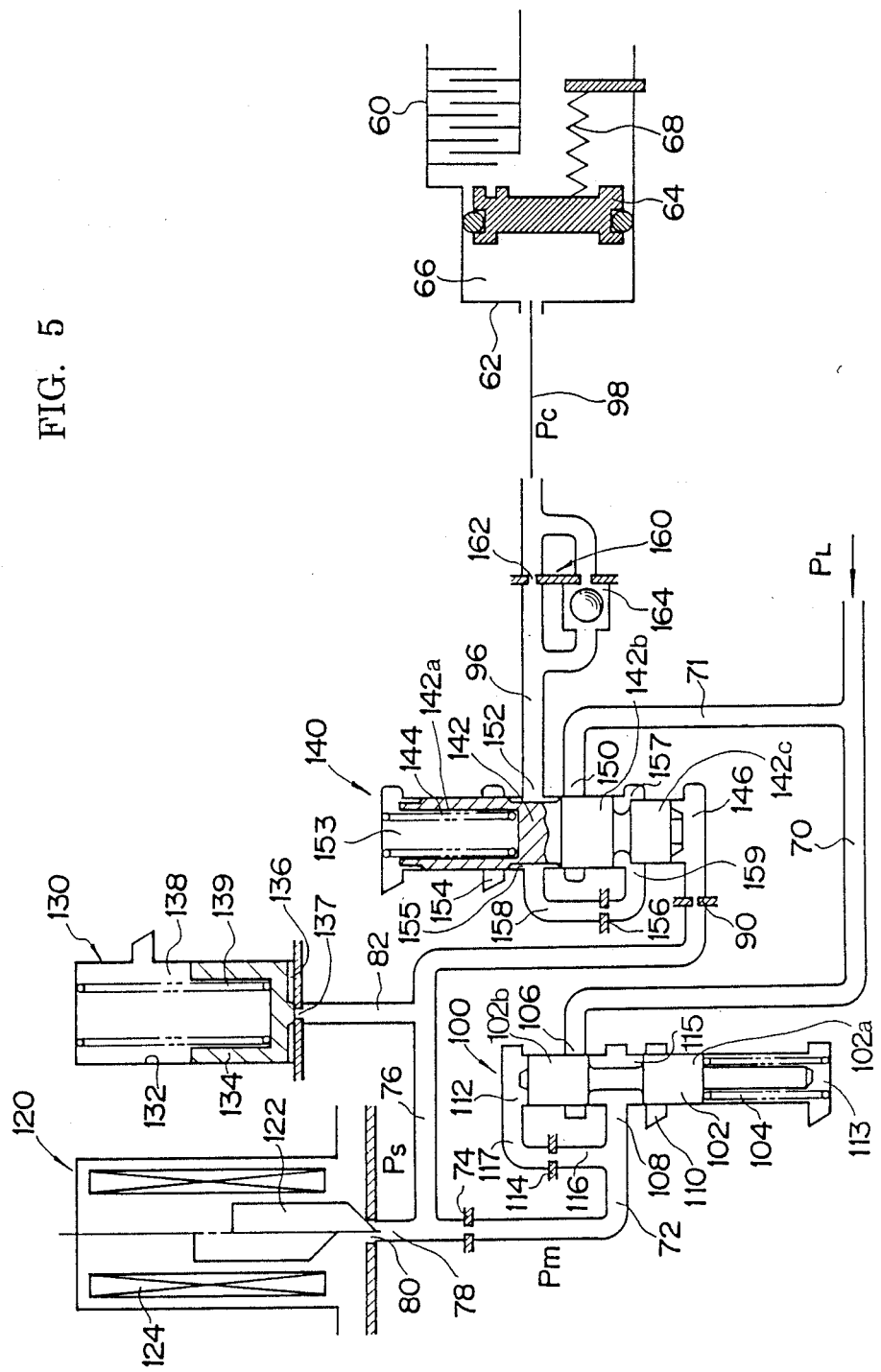
FIG. 5 is a schematic partial sectional view, like FIG. 3 for the first preferred embodiment, showing the second preferred embodiment of the 4WD torque distribution clutch hydraulic control device of the present invention, and also partly showing a 4WD torque distribution clutch which is being controlled by said second preferred embodiment.

Next, with regard to FIG. 5, the second preferred embodiment of the 4WD torque distribution clutch hydraulic control device of the present invention will be described. It should be understood that, in FIG. 5, like reference symbols to reference symbols in FIG. 3 relating to the first preferred embodiment correspond to like elements. FIG. 5, like FIG. 3 for the first preferred embodiment described above, shows the second preferred embodiment of the 4WD torque distribution clutch hydraulic control device of the present invention in partial schematic sectional view, and also partly shows a 4WD torque distribution clutch which is being controlled by said second preferred embodiment.

In this second preferred embodiment, the pressure produced in the conduit 76 downstream of the point thereof from which the branch conduit 82 is branched off is not supplied directly to the pressure chamber 66 of the hydraulic servo device 62 for said 4WD torque distribution clutch 60 as an actuating pressure therefor, as was the case in the first preferred embodiment. On the contrary, this end of the conduit 76 is connected, via a throttling device 90, to a signal pressure chamber 146 of a hydraulic clutch control valve 140.

This hydraulic clutch control valve 140 is also structured as a spool valve, and comprises a valve element 142 which slides longitudinally within a bore formed in a housing. This valve element 142 is structured with three land portions designated as 142a, 142b, and 142c, with the radial dimension of the land 142c being substantially less than the common radial dimension of the other two lands 142a and 142b. A spring chamber 153 is defined between the land 142a and the end of the valve bore in the longitudinal direction of said land 142a (the upper end of said valve bore in FIG. 5), while a first intermediate chamber 155 is defined between the land 142b and the land 142a, a second intermediate chamber 157 is defined between the land 142c and the land 142b, and the aforementioned signal pressure chamber 146 is defined between the land 142c and the end of the valve bore in the longitudinal direction of said land 142c (the lower end of said valve bore in FIG. 5). A compression coil spring 144 (partly received within a cavity formed in the land 142a) is provided within the spring chamber 153 between said land 142a and the upper end in the figure of the valve bore, and thus biases the valve element 142 in the downward direction in the figure, so as to diminish the volume of the signal pressure chamber 146. An output port 152 of this pressure setting valve 140 opens at a position in the side of the valve bore thereof so as to be always communicated to the first intermediate chamber 155, whatever be the position of the valve element 142 in the valve bore, and to this output port 148 there is connected an output conduit 96 for this valve 140. Also opening to this first intermediate chamber 155 there is connected a conduit 158, which leads the pressure in said first intermediate chamber 155 to a port 159 which opens to the second intermediate chamber 157, which in fact functions as a control pressure chamber, and midway along said conduit 158 there is located a throttling device 156. And the position of the port 159 along the valve bore of this pressure setting valve 140 is so arranged that it is always in communication with the second intermediate chamber 157, thus always communicating the pressure in the conduit 158 to said second intermediate chamber 157. Further, a port 150, which is supplied with the line pressure P1 via a conduit 71, opens to a position in the valve bore of this pressure setting valve 140 which is so arranged that, when the valve element 142 is in an upwardly displaced position in said valve bore as shown in the figure, then said port 150 is cut off from communication with the first intermediate chamber 155, thus completely discommunicating the line pressure in the conduit 71 from said first intermediate chamber 155; but, when said valve element 142 is in a more downwardly displaced position in said valve bore from its shown position, then said port 150 is progressively more and more put into communication with the first intermediate chamber 155, thus progressively more and more communicating the line pressure in the conduit 71 from said first intermediate chamber 155. Further, a drain port 154 is provided as opening to a position in the valve bore of this pressure setting valve 140 which is so arranged that, when the valve element 142 is in an even more upwardly displaced position in said valve bore than its position as shown in the figure, then said port 154 is put into communication with the first intermediate chamber 155, thus draining said first intermediate chamber 155.

By this construction a clutch control pressure Pc is established in the output conduit 96, determined basically according to the value of the signal pressure Ps present in the conduit 76 and supplied through the throttling device 90 to the signal pressure chamber 146 of this hydraulic clutch control valve 140, and the less, the greater is said pressure in said conduit 76. This is done according to the action that, with a particular such pressure being supplied to said signal pressure chamber 146, when the hydraulic fluid pressure in said output conduit 96 and in the first intermediate chamber 155 drops substantially below the equilibrium value therefor in these circumstances, after a certain determinate time period (determined by the throttling characteristics of the throttling device 156), then the hydraulic fluid pressure in the second intermediate chamber 157 drops, so that (because the radius of the land 142b of the valve element 142 is substantially larger than the radius of the land 142c thereof) said valve element 142 shifts somewhat downwards as seen in the figure due to the biasing action of the compression coil spring 144, thereby increasing the amount of communication provided by the port 150 past the land 142b of said valve element 142 and causing the hydraulic fluid pressure in the output conduit 96 thereafter to be raised according to increase of supply of line hydraulic fluid pressure Pl to said output conduit 96 from the conduit 71 via the intermediate chamber 155. On the other hand, when the hydraulic fluid pressure in the output conduit 96 rises substantially above said equilibrium pressure therefor in these circumstances, after a similar certain determinate time period, then the hydraulic fluid pressure in the second intermediate chamber 157 rises, so that the valve element 142 shifts somewhat upwards as seen in the figure against the biasing action of the compression coil spring 144 which is overcome, thereby decreasing the amount of communication provided by the port 150 past the land 142b of said valve element 142 and causing the hydraulic fluid pressure in the output conduit 96 thereafter to be dropped according to decrease of supply of line hydraulic fluid pressure Pl to said output conduit 96 from the conduit 71 via the intermediate chamber 155. In fact, if the hydraulic fluid pressure in the output conduit 96 is sufficiently much above said equilibrium pressure therefor in these circumstances, then the valve element 142 will shift so much upwards as seen in the figure against the biasing action of the compression coil spring 144 which is overcome, that the first intermediate chamber 155 will be communicated to the drain port 154, thereby even more quickly causing the hydraulic fluid pressure in the output conduit 96 thereafter to be dropped. According to a balance of these two effects, therefore, by a feedback process, an actuating hydraulic fluid pressure Pc for the 4WD torque distribution clutch 60 is provided by the pressure setting valve 140 within the output conduit 96, said actuating hydraulic fluid pressure Pc being basically determined by the biasing signal pressure within the signal pressure chamber 146, as well as by the spring characteristics of the compression coil spring 144 and by other fixed physical characteristics of the pressure setting valve 140.

Figure 6:
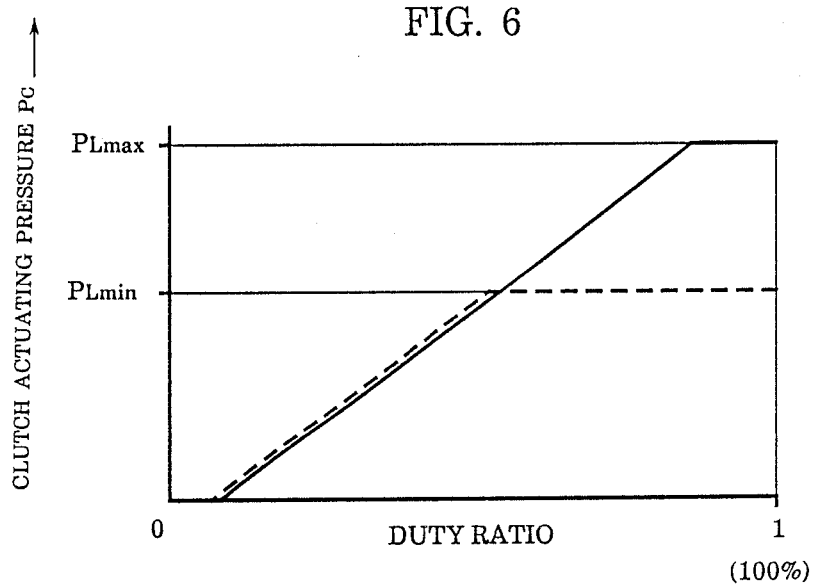
FIG. 6 is an exemplary and typical graph showing the variational behavior of the actuating pressure Pc (shown along the vertical axis) supplied to a pressure chamber of a hydraulic servo device for the 4WD torque distribution clutch of FIG. 5 as a control pressure therefor, with respect to the duty ratio (shown along the horizontal axis) of a pulse electrical signal supplied to a solenoid device included in the second preferred embodiment shown in that figure.

The characteristics of this actuating hydraulic fluid pressure Pc which is thus supplied to the 4WD torque distribution clutch 60, against the duty ratio of the pulsed electrical signal which is supplied to the solenoid device 124 of the electromagnetic drain valve 120, are exemplarily shown in FIG. 6.

The output port 152 is connected to the pressure chamber 66 of the hydraulic servo device 62 by the conduit 96; however, intermediate in said 96 there is provided a one way delay valve 160. This one way delay valve 160 comprises, fitted in parallel with one another, a throttling element 162 and a ball check valve 164 which only allows fluid to flow in the direction from the pressure chamber 66 of the hydraulic servo device 62 towards the port 152 but not in the reverse direction. The effect of this construction is to provide a delay in the case that the pressure in said pressure chamber 66 of said hydraulic servo device 62 is to be increased, while not providing such a delay in the contrary case that said pressure in said pressure chamber 66 of said hydraulic servo device 62 is to be decreased.

Again in this second preferred embodiment of the 4WD torque distribution clutch hydraulic control device of the present invention, the pressure present within the conduit 76, which is being supplied to the signal pressure chamber 146 of the hydraulic clutch control valve 140 as the signal hydraulic fluid pressure Ps, is also supplied to the hydraulic fluid pressure damper device 130, and accordingly, when wobbling or the like relatively small fluctuations tend to be induced in said signal hydraulic fluid pressure Ps present within the conduit 76, which could, for example and typically, be caused by the oscillatory duty ratio action for modulating said pressure Ps which is being performed by the electromagnetic drain valve 120, these wobbles and fluctuations are smoothed out by the damping or accumulator action of the hydraulic fluid pressure damper device 130 as described above, thus making for smoother control of the actuating hydraulic fluid pressure Pc for the 4WD torque distribution clutch 60 which is produced by the hydraulic clutch control valve 140 and is supplied to the pressure chamber 66 of the hydraulic servo device 62 for said 4WD torque distribution clutch 60. Thereby, as in the case of the first preferred embodiment, the engagement pressure of said 4WD torque distribution clutch 60 and hence the torque transmission capacity thereof are properly stabilized, and accordingly the torque distribution between the front wheels of the vehicle and the rear wheels of the vehicle is prevented from fluctuating, accordingly enhancing the drivability and the operational feeling of the vehicle, as well as decreasing the tire wear and increasing the roadability thereof.

The Third Preferred Embodiment

Figure 7:
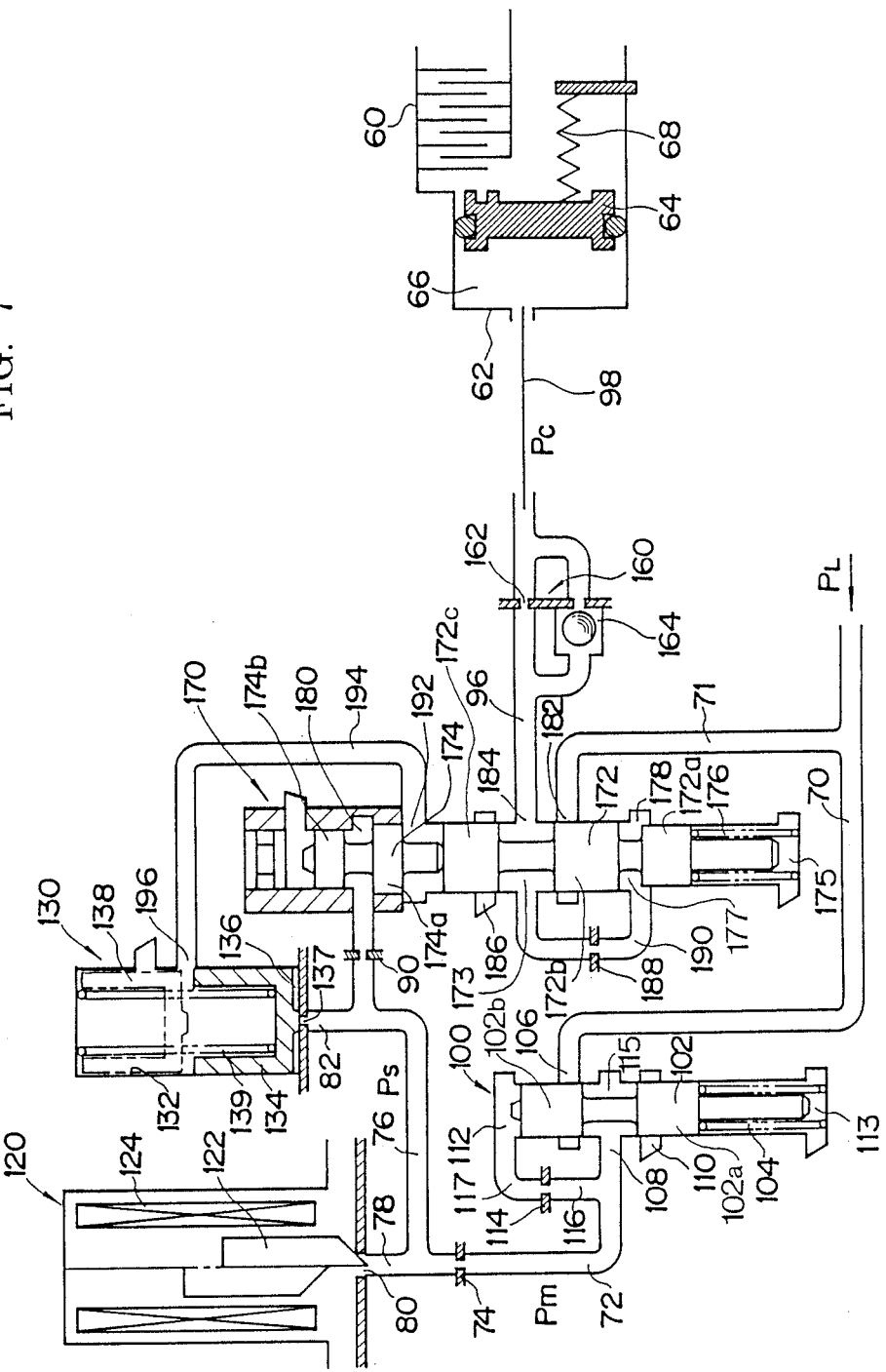
FIG. 7 is a schematic partial sectional view, like FIGS. 3 and 5 for the first and second preferred embodiments respectively, showing the third preferred embodiment of the 4WD torque distribution clutch hydraulic control device of the present invention, and also partly showing a 4WD torque distribution clutch which is being controlled by said third preferred embodiment.

Next, with regard to FIG. 7, the third preferred embodiment of the 4WD torque distribution clutch hydraulic control device of the present invention will be described. It should be understood that, in FIG. 7, like reference symbols to reference symbols in FIGS. 3 and 5 respectively relating to the first and second preferred embodiments correspond to like elements. FIG. 7, like FIGS. 3 and 5 respectively for the first and second preferred embodiments described above, shows the third preferred embodiment of the 4WD torque distribution clutch hydraulic control device of the present invention in partial schematic sectional view, and also partly shows a 4WD torque distribution clutch which is being controlled by said third preferred embodiment.

In this third preferred embodiment, as in the second preferred embodiment, the pressure produced in the conduit 76 downstream of the point thereof from which the branch conduit 82 is branched off is not supplied directly to the pressure chamber 66 of the hydraulic servo device 62 for said 4WD torque distribution clutch 60 as an actuating pressure therefor as was the case in the first preferred embodiment. On the contrary, this end of the conduit 76 is connected, via a throttling device 90, to a first signal pressure chamber 180 of a hydraulic clutch control valve 170. This hydraulic clutch control valve 170, in this third preferred embodiment, is now structured as a double type spool valve, and comprises a first valve element 172 and a second valve element 174, these two valve elements being mounted coaxially and sliding longitudinally within a bore formed in a housing.

The first valve element 172 is structured with three land portions designated as 172a, 172b, and 172c, with the radial dimension of the land 172a being substantially less than the common radial dimension of the other two lands 172b and 172c. A spring chamber 175 is defined between the land 172a and the end of the valve bore in the longitudinal direction of said land 172a (the lower end of said valve bore in FIG. 7), while a first intermediate chamber 173 is defined between the land 172c and the land 172b, and a second intermediate chamber 177 is defined between the land 172a and the land 172b. A second signal pressure chamber 192 is defined between the land 172c, which constitutes the upper end in the figure of the first valve element 172, and a larger land portion 174a of the second valve element 174. In more detail, the second valve element 174 is structured with two land portions designated as 174a and 174b, with the radial dimension of the land 174a being substantially greater than the radial dimension of the other land 174b. The first signal pressure chamber 180, previously mentioned, is defined between the land 174a and the land 174b of this second valve element 174, and a drain chamber is defined above the land 174b in the figure, between it and its end of the valve bore, while the second signal pressure chamber 192 is defined between the land 174a of this second valve element 174 and the land 172c of the first valve element 172.

Referring first to the arrangements relative to the first valve element 172, a compression coil spring 144 is provided within the spring chamber 175 between the land 172a of the first valve element 172 and the lower end in the figure of the valve bore, and thus biases the first valve element 172, and the second valve element 174 when it is in abutting contact with said first valve element 172 as is the typical case, in the upward direction in the figure, so as to diminish the volumes of the first signal pressure chamber 180 and the second signal pressure chamber 192. An output port 184 of this pressure setting valve 170 opens at a position in the side of the valve bore thereof so as to be always communicated to the first intermediate chamber 173, whatever be the position of the first valve element 172 in the valve bore, and to this output port 184 there is connected an output conduit 96 for this valve 170. Also opening to this first intermediate chamber 173 there is connected a conduit 190, which leads the pressure in said first intermediate chamber 173 to a port 178 which opens to the second intermediate chamber 177, which in fact functions as a control pressure chamber, and midway along said conduit 190 there is located a throttling device 188. And the position of the port 178 along the valve bore of this pressure setting valve 170 is so arranged that it is always in communication with the second intermediate chamber 177, thus always communicating the pressure in the conduit 190 to said second intermediate chamber 177. Further, a port 182, which is supplied with the line pressure P1 via a conduit 71, opens to a position in the valve bore of this pressure setting valve 170 which is so arranged that, when the first valve element 172 is in an upwardly displaced position in said valve bore as shown in the figure, then said port 182 is cut off from communication with the first intermediate chamber 173, thus completely discommunicating the line pressure in the conduit 71 from said first intermediate chamber 173; but, when said first valve element 172 is in a more downwardly displaced position in said valve bore from its shown position, then said port 182 is progressively more and more put into communication with the first intermediate chamber 173, thus progressively more and more communicating the line pressure in the conduit 71 with said first intermediate chamber 173. Further, a drain port 186 is provided as opening to a position in the valve bore of this pressure setting valve 170 which is so arranged that, when the first valve element 172 is in an even more upwardly displaced position in said valve bore than its position as shown in the figure, then said port 186 is put into communication with the first intermediate chamber 173, thus draining said first intermediate chamber 173.

And, referring now to the arrangements relative to the second valve element 174, the first signal pressure chamber 180 which is defined between the lands 174a and 174b thereof is, as mentioned above, communicated to the conduit 76 via the throttling device 90 and thus receives the signal pressure Ps produced in said conduit 76 by the pressure setting valve 100, as modulated by the electromagnetic drain valve 120 and damped by the hydraulic fluid pressure damper device 130. This signal pressure Ps present in said first signal pressure chamber 180 tends to urge the second valve element 174 in the downwards direction in the figure, due to the difference in the radiuses of the lands 174a and 174b thereof. And, further, to the second signal pressure chamber 192 defined between the land 172c of the first valve element 172 and the land 174a of the second valve element 174 there is supplied, via a conduit 194, an override pressure produced at a port 196 of the hydraulic fluid pressure damper device 130. In more detail, when the damper piston 134 of said hydraulic fluid pressure damper device 130 is at its extreme upwards position in the figure as shown therein by dashed lines, i.e. when the hydraulic damper chamber 136 is at its maximum volume, which is naturally caused by the signal pressure Ps in the conduit 76 being equal to or greater than the pressure value required to sufficiently compress the compression coil spring 139 to the corresponding extent, then said damper piston 134 allows communication between this port 196 and the hydraulic damper chamber 136, so as to allow the signal pressure Ps to be directly transmitted from said hydraulic damper chamber 136 to the conduit 194 and thence to the second signal pressure chamber 192.

By this construction a clutch control pressure Pc is established in the output conduit 96, determined basically according to the value of the signal pressure Ps present in the conduit 76 and supplied through the throttling device 90 to the first signal pressure chamber 180 of this hydraulic clutch control valve 170, and the greater, the greater is said signal pressure Ps in said conduit 76. This is done according to the action that, with a particular such pressure Ps being supplied to said first signal pressure chamber 180, when the hydraulic fluid pressure in said output conduit 96 and in the first intermediate chamber 173 drops substantially below the equilibrium value therefor in these circumstances, after a certain determinate time period (determined by the throttling characteristics of the throttling device 188), then the hydraulic fluid pressure in the second intermediate chamber 177 drops, so that (because the radius of the land 172b of the first valve element 172 is substantially larger than the radius of the land 172a thereof) said first valve element 172 shifts somewhat downwards as seen in the figure due to the biasing action of the signal pressure Ps in the first signal pressure chamber 180 against the biasing action of the compression coil spring 144 which is overcome, thereby increasing the amount of communication provided by the port 182 past the land 172b of said first valve element 172 and causing the hydraulic fluid pressure in the output conduit 96 thereafter to be raised according to increase of supply of line hydraulic fluid pressure P1 to said output conduit 96 from the conduit 71 via the intermediate chamber 173. On the other hand, when the hydraulic fluid pressure in the output conduit 96 rises substantially above said equilibrium pressure therefor in these circumstances, after a similar certain determinate time period, then the hydraulic fluid pressure in the second intermediate chamber 177 rises, so that the first valve element 172 shifts somewhat upwards as seen in the figure against the biasing action of the signal pressure Ps which is overcome and with the aid of the biasing action of the compression coil spring 176, thereby decreasing the amount of communication provided by the port 182 past the land 172b of said first valve element 172 and causing the hydraulic fluid pressure in the output conduit 96 thereafter to be dropped according to decrease of supply of line hydraulic fluid pressure P1 to said output conduit 96 from the conduit 71 via the intermediate chamber 173. In fact, as before, if the hydraulic fluid pressure in the output conduit 96 is sufficiently much above said equilibrium pressure therefor in these circumstances, then the first valve element 172 will shift so much upwards as seen in the figure against the biasing action of the signal pressure Ps which is overcome and with the aid of the biasing action of the compression coil spring 176, that the first intermediate chamber 173 will be communicated to the drain port 186, thereby even more quickly causing the hydraulic fluid pressure in the output conduit 96 thereafter to be dropped. According to a balance of these two effects, therefore, by a feedback process, an actuating hydraulic fluid pressure Pc for the 4WD torque distribution clutch 60 is provided by the pressure setting valve 170 within the output conduit 96, said actuating hydraulic fluid pressure Pc being basically determined by the biasing signal pressure Ps within the first signal pressure chamber 180, as well as by the spring characteristics of the compression coil spring 176 and by other fixed physical characteristics of the pressure setting valve 170. Further, when the signal pressure Ps in the conduit 76 becomes equal to or greater than the pressure value required to sufficiently compress the compression coil spring 139 of the hydraulic fluid pressure damper device 130 to the extent required for said damper piston 134 to allow communication between the port 196 and the hydraulic damper chamber 136, i.e. when the damper piston 134 of said hydraulic fluid pressure damper device 130 is at its extreme upwards position in the figure as shown therein by dashed lines and when the hydraulic damper chamber 136 is at its maximum volume, then the signal pressure Ps is directly transmitted from said hydraulic damper chamber 136 to the conduit 194 and thence to the second signal pressure chamber 192 as an override pressure, which definitely and positively biases the first valve element 172 downwards in the figure, against the biasing action of the compression coil spring 176 which is completely overcome, so as definitely and positively to cause the land 172b of said first valve element 172 to put the first intermediate chamber 173 in constant communication with the port 182 to receive a continuous supply of the line pressure P1 from the conduit 71; and thereby in these circumstances the pressure chamber 66 of the hydraulic servo device 62 for the 4WD torque distribution clutch 60 receives a full and continuous supply of the full line pressure P1, via a one way delay valve 160 which is of the same type as the one way delay valve 160 included in the second preferred embodiment of the present invention described above.

Figure 8:
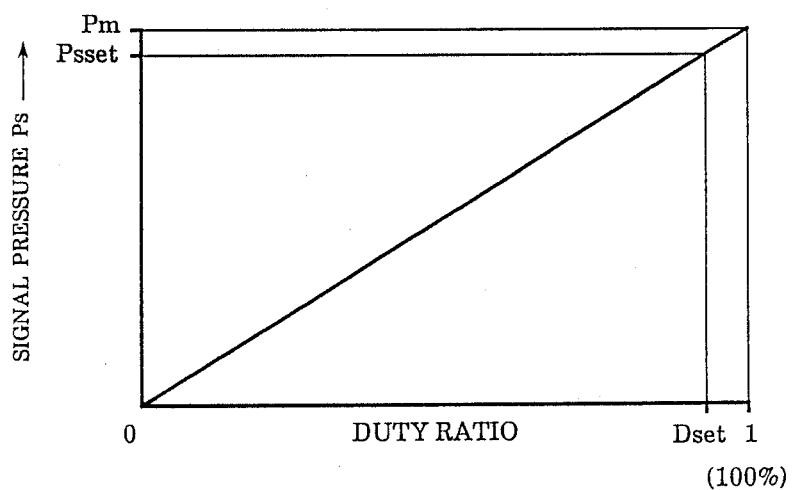
FIG. 8 is an exemplary and typical graph showing the variational behavior of a signal pressure Ps (shown along the vertical axis) present in an intermediate conduit of the third preferred embodiment shown in FIG. 7, with respect to the duty ratio (shown along the horizontal axis) of a pulse electrical signal supplied to a solenoid device included in said third preferred embodiment.

FIG. 8 is an exemplary and typical graph showing the variational behavior of the signal pressure Ps with respect to the duty ratio of the electrical signal supplied to the solenoid device 124, in this third preferred embodiment. It will be understood that, in this third preferred embodiment, the electromagnetic drain valve 120 has the opposite characteristics to those which pertained to the electromagnetic drain valves 120 of the first and the second preferred embodiments; in other words, when actuating electrical energy is being supplied to said solenoid device 124, i.e. when said solenoid device 124 is in the ON state, the tip of the valve element 122 is pressed against the drain port 80 and substantially closes said drain port 80, whereby the pressure in the conduit 76 is not substantially reduced, and the pressure supplied towards the pressure chamber 66 of the hydraulic servo device 62 for the 4WD torque distribution clutch 60 is not substantially interfered with; while, when no actuating electrical energy is being supplied to said solenoid device 124, i.e. when said solenoid device 124 is in the OFF state, the tip of said valve element 122 is withdrawn from the drain port 80 and does not close said drain port 80, whereby the pressure in the conduit 76 is substantially completely drained, and the pressure supplied to the pressure chamber 66 of the hydraulic servo device 62 for the 4WD torque distribution clutch 60 is reduced.

Figure 9:
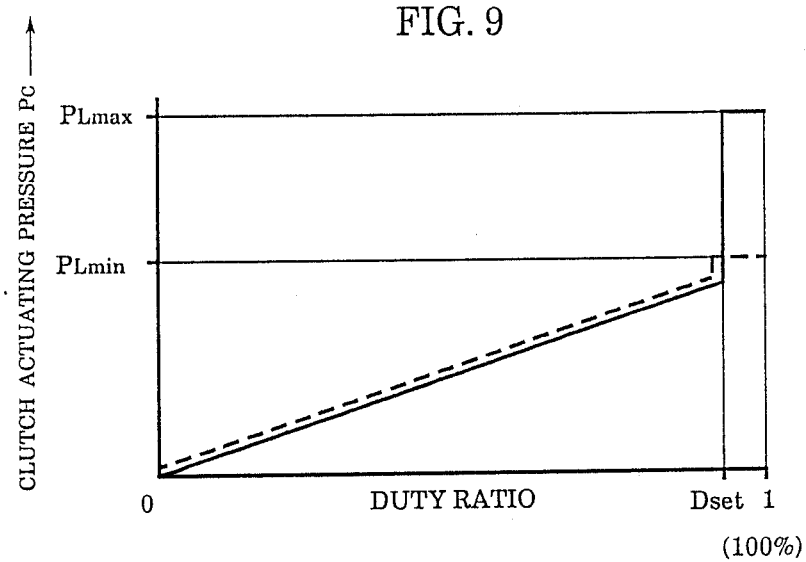
FIG. 9 is an exemplary and typical graph showing the variational behavior of the actuating pressure Pc (shown along the vertical axis) supplied to a pressure chamber of a hydraulic servo device for the 4WD torque distribution clutch of FIG. 7 as a control pressure therefor, with respect to said duty ratio (shown along the horizontal axis) of said pulse electrical signal supplied to said solenoid device included in said third preferred embodiment.

And the characteristics in this third preferred embodiment of the 4WD torque distribution clutch hydraulic control device of the present invention of the variational behavior of the actuating hydraulic fluid pressure Pc which is supplied to the 4WD torque distribution clutch 60, relative to the duty ratio of the pulsed electrical signal which is supplied to the solenoid device 124 of the electromagnetic drain valve 120, are exemplarily shown in FIG. 9. Considering FIG. 9 in conjunction with FIG. 8, it will be understood that, in this third preferred embodiment, as the duty ratio of the pulsed electrical signal which is supplied to the solenoid device 124 of the electromagnetic drain valve 120 increases from 0% upwards, the signal pressure Ps and also the actuating hydraulic fluid pressure Pc for the 4WD torque distribution clutch 60 both increase substantially linearly, until said duty ratio reaches a certain threshold value Dset, at which point the signal pressure Ps reaches a threshold value Psset, which in fact is the above described value of the signal pressure Ps at which the compression coil spring 139 of the hydraulic fluid pressure damper device 130 becomes compressed to the extent required for said damper piston 134 to allow communication between the port 196 and the hydraulic damper chamber 136, i.e. at which the damper piston 134 of said hydraulic fluid pressure damper device 130 arrives at its extreme upwards position in the figure as shown therein by dashed lines so that the hydraulic damper chamber 136 is at its maximum volume. At this time, the signal pressure Ps is directly transmitted through said hydraulic damper chamber 136 to the conduit 194 and thence to the second signal pressure chamber 192 as an override pressure, and accordingly the first valve element 172 is overridingly pushed downwards in the figure against the biasing action of the compression coil spring 176 which is completely overcome, and the land 172b of said first valve element 172 definitely puts the first intermediate chamber 173 in constant communication with the port 182 to receive a continuous supply of the line pressure P1 from the conduit 71. Thus, at this time point, the actuating hydraulic fluid pressure Pc supplied to the pressure chamber 66 of the hydraulic servo device 62 for the 4WD torque distribution clutch 60 becomes equal to the current value of the line pressure P1, i.e. becomes equal to some value between the lowest possible value PLmin for said line pressure P1 and the highest possible value PLmax for said line pressure P1. And, of course, further increase of the duty ratio of the pulse electrical signal has no further effect upon said actuating hydraulic fluid pressure Pc.

Now, it is advantageous, in order to reap the best possible benefit from the concept of this particular third preferred embodiment, for the threshold value Dset of the duty ratio, at which the clutch actuating pressure Pc suddenly is increased to the line pressure value from having been increasing at a relatively gradual rate relative to the duty ratio, to be set near 100%, i.e. near unity duty ratio, but not quite at 100%. In other words, in any case regardless of the actual value of the line pressure P1, as the duty ratio increases from zero up to the value Dset, the actuating hydraulic fluid pressure Pc for the 4WD torque distribution clutch 60 increases substantially linearly at a relatively modest rate, to approach, as the duty ratio approaches the value Dset, a value substantially less than the minimum possible value PLmin for the line pressure. Not only does this mean that the majority of the range of variability of the duty ratio can be used more effectively and more sensitively for control of the clutch actuating hydraulic fluid pressure Pc, because the rate of variation of said actuating hydraulic fluid pressure Pc with regard to the duty ratio is smaller than if strict proportionality over both their entire ranges were implemented, but also it means that, over this control range, there is no disturbance of the actual actuating hydraulic fluid pressure Pc provided, caused by disturbance of the actual value of the line pressure P1. On the other hand, when the duty ratio rises above the threshold value Dset, then full line pressure P1, whatever may be the current value thereof, is supplied to the 4WD torque distribution clutch 60 as the actuating hydraulic fluid pressure Pc therefor, thus, at this time, ensuring complete and effective engagement of said 4WD torque distribution clutch 60, and precluding the possibility of the occurrence of any deficiency of engagement pressure for said 4WD torque distribution clutch 60.

Again in this third preferred embodiment of the 4WD torque distribution clutch hydraulic control device of the present invention, the pressure present within the conduit 76, which is being supplied to the first signal pressure chamber 180 of the hydraulic clutch control valve 170 as the signal hydraulic fluid pressure Ps, is also supplied to the hydraulic fluid pressure damper device 130, and accordingly, when wobbling or the like relatively small fluctuations tend to be induced in said signal hydraulic fluid pressure Ps present within the conduit 76, which could, for example and typically, be caused by the oscillatory duty ratio action for modulating said pressure Ps which is being performed by the electromagnetic drain valve 120, these wobbles and fluctuations are smoothed out by the damping or accumulator action of the hydraulic fluid pressure damper device 130 as described above, thus making for smoother control of the actuating hydraulic fluid pressure Pc for the 4WD torque distribution clutch 60 which is finally produced by the hydraulic clutch control valve 170 and is supplied to the pressure chamber 66 of the hydraulic servo device 62 for said 4WD torque distribution clutch 60. Thereby, as in the case of the first and the second preferred embodiments, the engagement pressure of said 4WD torque distribution clutch 60 and hence the torque transmission capacity thereof are properly stabilized, and accordingly the torque distribution between the front wheels of the vehicle and the rear wheels of the vehicle is prevented from fluctuating, accordingly enhancing the drivability and the operational feeling of the vehicle, as well as decreasing the tire wear and increasing the roadability thereof.

The Fourth Preferred Embodiment

Figure 10:
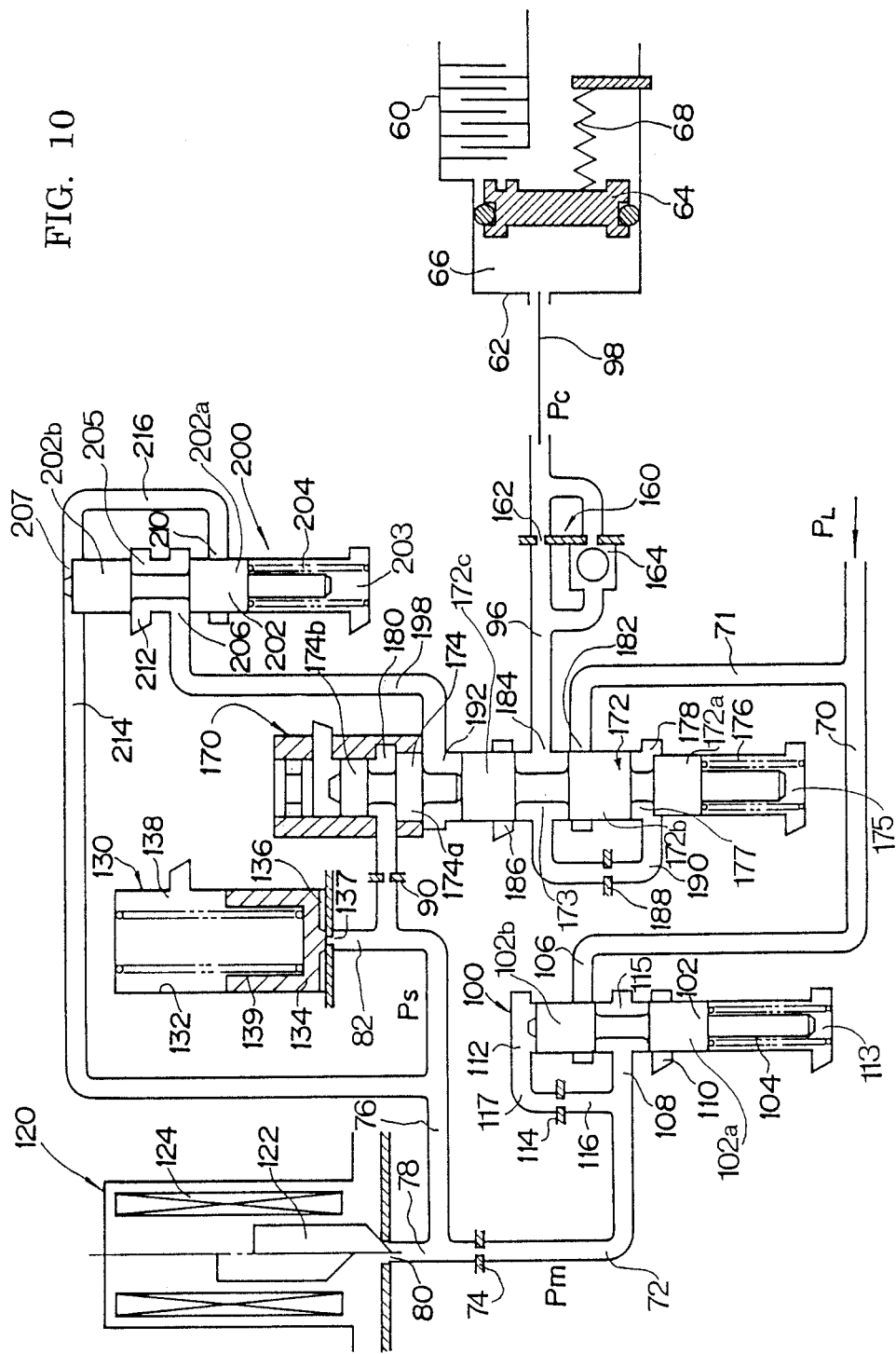
FIG. 10 is a schematic partial sectional view, like FIGS. 3, 5, and 7 for the first, second, and third preferred embodiments respectively, showing the fourth preferred embodiment of the 4WD torque distribution clutch hydraulic control device of the present invention, and also partly showing a 4WD torque distribution clutch which is being controlled by said fourth preferred embodiment.

Next, with regard to FIG. 10, the fourth preferred embodiment of the 4WD torque distribution clutch hydraulic control device of the present invention will be described. It should be understood that, in FIG. 10, like reference symbols to reference symbols in FIGS. 3, 5, and 7 respectively relating to the first, the second, and the third preferred embodiments correspond to like elements. FIG. 10, like FIGS. 3, 5, and 7 respectively for the first, second, and third preferred embodiments described above, shows the fourth preferred embodiment of the 4WD torque distribution clutch hydraulic control device of the present invention in partial schematic sectional view, and also partly shows a 4WD torque distribution clutch which is being controlled by said fourth preferred embodiment.

In this fourth preferred embodiment, as in the third preferred embodiment, when the pressure produced in the conduit 76 rises above a threshold value, then the hydraulic clutch control valve 170, which again in this fourth preferred embodiment is structured as a double type spool valve, is forcibly switched over to its position to allow full line pressure P1 to be supplied continuously as actuating hydraulic fluid pressure Pc for the 4WD torque distribution clutch 60. However, the means for doing this are different from, and more sophisticated than, the means provided in the case of the third preferred embodiment described above. In detail, the hydraulic clutch control valve 170 is structured just as in the case of the third preferred embodiment, but the second signal pressure chamber 192 thereof is supplied with a control pressure, not from any port of the hydraulic fluid pressure damper device 130 such as the port 196 of the hydraulic fluid pressure damper device 130 of the third preferred embodiment—for in fact the hydraulic fluid pressure damper device 130 of this fourth preferred embodiment has no such port and is substantially identical to the hydraulic fluid pressure damper devices 130 of the first and of the second preferred embodiments—but instead with a control pressure produced from a pressure switchover valve 200, which is additionally provided in this fourth preferred embodiment.

In detail, this pressure switchover valve 200, in this fourth preferred embodiment, is also structured as a spool valve, and comprises a valve element 202 which slides longitudinally within a bore formed in a housing. This valve element 202 is structured with two land portions designated as 202a and 202b. A spring chamber 203 is defined between the land 202a and the end of the valve bore in the longitudinal direction of said land 202a (the lower end of said valve bore in FIG. 10), while an intermediate chamber 205 is defined between the land 202a and the land 202b, and a control pressure chamber 207 is defined between the land 202b and the end of the valve bore in the longitudinal direction of said land 202b (the upper end of said valve bore in FIG. 10). A compression coil spring 204 is provided within the spring chamber 203 between the land 202a of the valve element 202 and the lower end in the figure of the valve bore, and thus biases said valve element 202 in the upward direction in the figure, so as to diminish the volume of the control pressure chamber 207. And to the control pressure chamber 207 there is supplied the signal pressure Ps present in the conduit 76 via a conduit 214, so as to bias the valve element 202 in the downward direction in the figure. An output port 206 of this pressure switchover valve 200 opens at a position in the side of the valve bore thereof so as to be always communicated to the intermediate chamber 205, whatever be the position of the valve element 202 in the valve bore, and to this output port 206 there is connected an output conduit 198 for this valve 200. Further, a port 210, which is supplied with the signal pressure Ps present in the conduit 76 via the control pressure chamber 207 and via another conduit 216, opens to a position in the valve bore of this pressure switchover valve 200 which is so arranged that, when the valve element 202 is in an upwardly displaced position in said valve bore as shown in the figure, then said port 210 is cut off from communication with the intermediate chamber 205, thus completely discommunicating the signal pressure Ps in the conduit 76 from said intermediate chamber 205; but, when said valve element 202 is in a more downwardly displaced position in said valve bore than its shown position, then said port 210 is put into communication with the intermediate chamber 205, thus communicating the signal pressure Ps in the conduit 76 with said intermediate chamber 205 and supplying said signal pressure Ps to the output port 206 and to the output conduit 198 of this pressure switchover valve 200. Further, a drain port 212 is provided as opening to a position in the valve bore of this pressure switchover valve 200 which is so arranged that, when the valve element 202 is in an upwardly displaced position in said valve bore as shown in the figure, then said port 212 is put into communication with the intermediate chamber 205, thus draining said intermediate chamber 205. And the output conduit 198 of this pressure switchover valve 200 is connected to the second signal pressure chamber 192 of the hydraulic clutch control valve 170, which is itself structured just as in the case of the third preferred embodiment, described above.

This pressure switchover valve 200 functions as follows. When a signal pressure Ps of a pressure value less than a determinate value (corresponding to the value Psset of FIG. 8) is present in the conduit 76, and is accordingly transmitted via the conduit 214 to the control pressure chamber 207 of this pressure switchover valve 200, then the biasing action of the compression coil spring 204 is not at all overcome thereby, and the valve element 202 is maintained as in its upwardly shifted position in its valve bore as shown in the figure, and the output port 206 of this valve 200 is put into communication, via the intermediate chamber 205, with the drain port 212, and accordingly the output conduit 198 and the second signal pressure chamber 192 of the hydraulic clutch control valve 170 are both drained; in other words, no override pressure is supplied to said hydraulic clutch control valve 170. On the other hand, when a signal pressure Ps of a pressure value greater than said determinate value corresponding to the value Psset of FIG. 8 is present in the conduit 76, and is accordingly transmitted via the conduit 214 to the control pressure chamber 207 of this pressure switchover valve 200, then the biasing action of the compression coil spring 204 is substantially completely overcome thereby, and the valve element 202 becomes shifted to its downwardly shifted position in its valve bore, and the output port 206 of this valve 200 is now put into communication, via the intermediate chamber 205, with the port 210 to which the signal pressure Ps is being supplied, and accordingly the output conduit 198 and the second signal pressure chamber 192 of the hydraulic clutch control valve 170 are now both supplied with this signal pressure Ps; in other words, an override pressure, equal to the signal pressure Ps, is supplied to said hydraulic clutch control valve 170. And, accordingly, said hydraulic clutch control valve 170 is switched over, and the results of this are substantially the same as in the case of the third preferred embodiment of the present invention, described earlier.

Accordingly, in this fourth preferred embodiment also, as the duty ratio of the pulse electrical signal supplied to the solenoid device 124 of the electromagnetic drain valve 120 increases from zero up to the value Dset, the actuating hydraulic fluid pressure Pc for the 4WD torque distribution clutch 60 increases substantially linearly and at a relatively modest rate, to approach, as the duty ratio approaches the threshold value Dset, a value substantially less than the minimum possible value for the line pressure. Thereby, as before, the majority of the range of variability of the duty ratio can be used more effectively and more sensitively for control of the clutch actuating hydraulic fluid pressure Pc, because the rate of variation of said actuating hydraulic fluid pressure Pc with regard to the duty ratio is smaller than if strict proportionality over both their entire ranges were implemented. And, further as before, over this control range there is no disturbance of the actual actuating hydraulic fluid pressure Pc provided, caused by disturbance of the actual value of the line pressure Pl. On the other hand, when the duty ratio rises above the threshold value Dset, then full line pressure P1, whatever may be the current value thereof, is supplied to the 4WD torque distribution clutch 60 as the actuating hydraulic fluid pressure Pc therefor, thus, at this time, ensuring complete and effective engagement of said 4WD torque distribution clutch 60, and precluding the possibility of the occurrence of any deficiency of engagement pressure for said 4WD torque distribution clutch 60.

Again in this fourth preferred embodiment of the 4WD torque distribution clutch hydraulic control device of the present invention, the pressure present within the conduit 76, which is being supplied to the first signal pressure chamber 180 of the hydraulic clutch control valve 170 as the signal hydraulic fluid pressure Ps, is also supplied to the hydraulic fluid pressure damper device 130, and accordingly, when wobbling or the like relatively small fluctuations tend to be induced in said signal hydraulic fluid pressure Ps present within the conduit 76, which could, for example and typically, be caused by the oscillatory duty ratio action for modulating said pressure Ps which is being performed by the electromagnetic drain valve 120, these wobbles and fluctuations are smoothed out by the damping or accumulator action of the hydraulic fluid pressure damper device 130 as described above, thus making for smoother control of the actuating hydraulic fluid pressure Pc for the 4WD torque distribution clutch 60 which is finally produced by the hydraulic clutch control valve 170 and is supplied to the pressure chamber 66 of the hydraulic servo device 62 for said 4WD torque distribution clutch 60. Thereby, as in the case of the first through the third preferred embodiments, the engagement pressure of said 4WD torque distribution clutch 60 and hence the torque transmission capacity thereof are properly stabilized, and accordingly the torque distribution between the front wheels of the vehicle and the rear wheels of the vehicle is prevented from fluctuating, accordingly enhancing the drivability and the operational feeling of the vehicle, as well as decreasing the tire wear and increasing the roadability thereof.

The Fifth Preferred Embodiment

Figure 11:
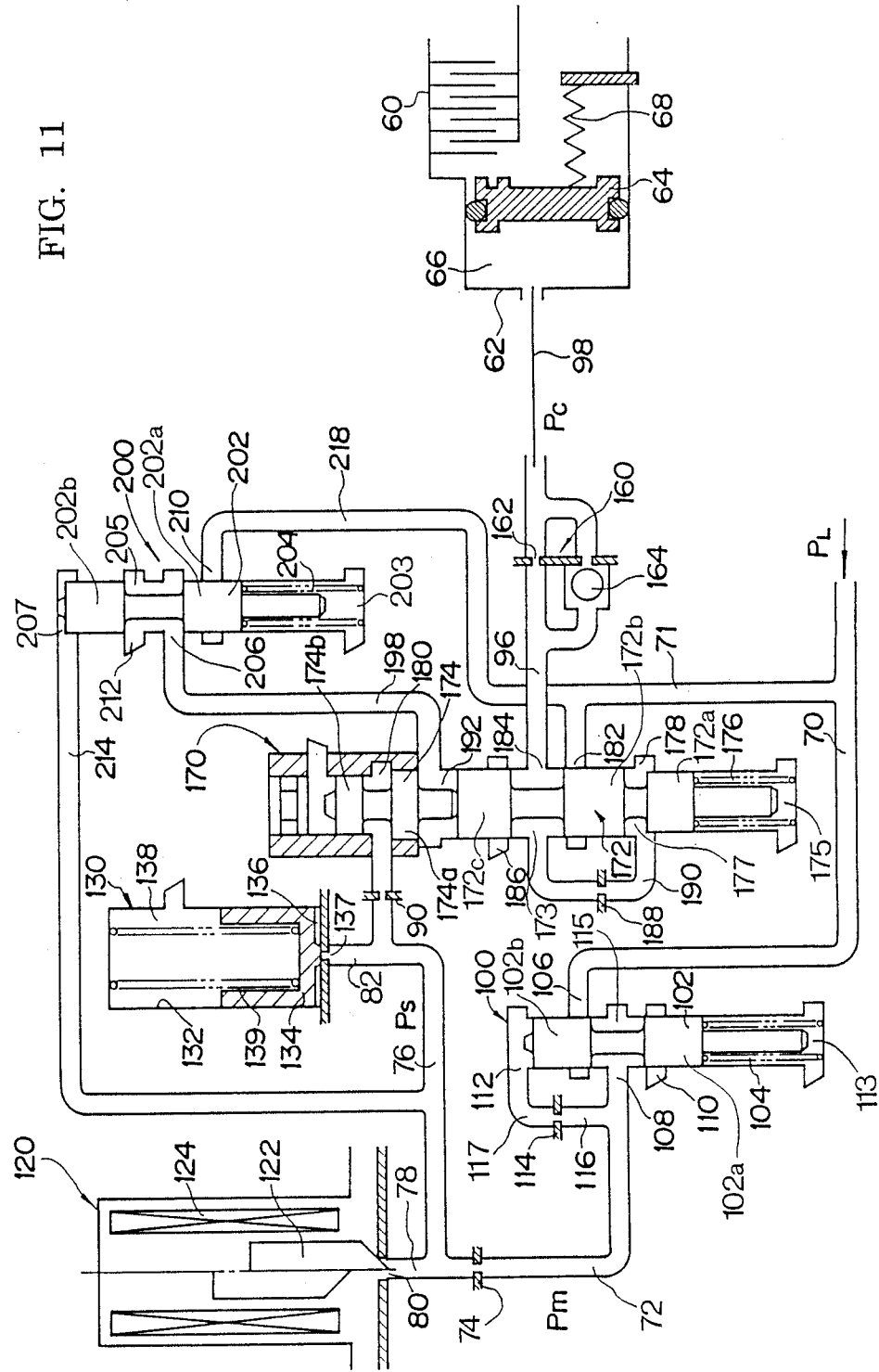
FIG. 11 is a schematic partial sectional view, like FIGS. 3, 5, 7, and 10 for the first, second, third, and fourth preferred embodiments respectively, showing the fifth preferred embodiment of the 4WD torque distribution clutch hydraulic control device of the present invention, and also partly showing a 4WD torque distribution clutch which is being controlled by said fifth preferred embodiment.

Next, with regard to FIG. 11, the fifth preferred embodiment of the 4WD torque distribution clutch hydraulic control device of the present invention will be described. It should be understood that, in FIG. 11, like reference symbols to reference symbols in FIGS. 3, 5, 7, and 10 respectively relating to the first, the second, the third, and the fourth preferred embodiments correspond to like elements. FIG. 11, like FIGS. 3, 5, 7, and 10 respectively for the first, second, third, and fourth preferred embodiments described above, shows the fifth preferred embodiment of the 4WD torque distribution clutch hydraulic control device of the present invention in partial schematic sectional view, and also partly shows a 4WD torque distribution clutch which is being controlled by said fifth preferred embodiment.

In this fifth preferred embodiment, the only substantial difference from the fourth preferred embodiment described above is that the port 210 of the pressure switchover valve 200 is supplied, not with the signal pressure Ps present in the conduit 76, but instead, via a conduit 218, with the line pressure P1. The output conduit 198 of this pressure switchover valve 200 is connected to the second signal pressure chamber 192 of the hydraulic clutch control valve 170, just as in the case of the fourth preferred embodiment described above. It will be easily understood that this pressure switchover valve 200 functions analogously to the pressure switchover valve 200 of the fourth preferred embodiment described above, with the additional advantage that the override pressure for the hydraulic clutch control valve 170, when supplied, is greater in its magnitude, being equal to the line pressure P1 rather than to the signal pressure Ps. Accordingly, when said hydraulic clutch control valve 170 is thus overridingly switched over, this is performed even better and more snappily than in the case of the fourth preferred embodiment of the present invention described above.

Accordingly, in this fifth preferred embodiment also, as the duty ratio of the pulse electrical signal supplied to the solenoid device 124 of the electromagnetic drain valve 120 increases from zero up to the value Dset, the actuating hydraulic fluid pressure Pc for the 4WD torque distribution clutch 60 increases substantially linearly and at a relatively modest rate, to approach, as the duty ratio approaches the threshold value Dset, a value substantially less than the minimum possible value for the line pressure. Thereby, as before, the majority of the range of variability of the duty ratio can be used more effectively and more sensitively for control of the clutch actuating hydraulic fluid pressure Pc, because the rate of variation of said actuating hydraulic fluid pressure Pc with regard to the duty ratio is smaller than if strict proportionality over both their entire ranges were implemented. And, further as before, over this control range there is no disturbance of the actual actuating hydraulic fluid pressure Pc provided, caused by disturbance of the actual value of the line pressure P1. On the other hand, when the duty ratio rises above the threshold value Dset, then the full line pressure P1, whatever may be the current value thereof, is supplied as the override pressure for the hydraulic clutch control valve 170, and this full line pressure P1 is accordingly definitely supplied to the 4WD torque distribution clutch 60 as the actuating hydraulic fluid pressure Pc therefor, thus, at this time, ensuring complete and effective engagement of said 4WD torque distribution clutch 60, and precluding the possibility of the occurrence of any deficiency of engagement pressure for said 4WD torque distribution clutch 60.

Again in this fifth preferred embodiment of the 4WD torque distribution clutch hydraulic control device of the present invention, the pressure present within the conduit 76, which is being supplied to the first signal pressure chamber 180 of the hydraulic clutch control valve 170 as the signal hydraulic fluid pressure Ps, is also supplied to the hydraulic fluid pressure damper device 130, and accordingly, when wobbling or the like relatively small fluctuations tend to be induced in said signal hydraulic fluid pressure Ps present within the conduit 76, which could, for example and typically, be caused by the oscillatory duty ratio action for modulating said pressure Ps which is being performed by the electromagnetic drain valve 120, these wobbles and fluctuations are smoothed out by the damping or accumulator action of the hydraulic fluid pressure damper device 130 as described above, thus making for smoother control of the actuating hydraulic fluid pressure Pc for the 4WD torque distribution clutch 60 which is finally produced by the hydraulic clutch control valve 170 and is supplied to the pressure chamber 66 of the hydraulic servo device 62 for said 4WD torque distribution clutch 60. Thereby, as in the case of the first through the third preferred embodiments, the engagement pressure of said 4WD torque distribution clutch 60 and hence the torque transmission capacity thereof are properly stabilized, and accordingly the torque distribution between the front wheels of the vehicle and the rear wheels of the vehicle is prevented from fluctuating, accordingly enhancing the drivability and the operational feeling of the vehicle, as well as decreasing the tire wear and increasing the roadability thereof.

Conclusion

Although the present invention has been shown and described in terms of the preferred embodiments thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. For a hydraulically actuated torque distribution clutch in a four wheel drive device in a power train of an automotive vehicle:
   a hydraulic fluid pressure control device, comprising:
   (a) a means for producing a control hydraulic fluid pressure for actuating said torque distribution clutch according to an oscillatory release of part of hydraulic fluid pressure supplied from a source of hydraulic fluid pressure;
   (b) an output conduit for conducting said control hydraulic fluid pressure from said control hydraulic fluid pressure producing means toward said torque distribution clutch; and
   (c) an accumulator type hydraulic fluid pressure damper connected to said output conduit for smoothing hydraulic pressure fluctuations caused in said output conduit by said oscillatory release of hydraulic fluid.

2. A hydraulic fluid pressure control device according to claim 1, wherein said oscillatory release of hydraulic fluid pressure is carried out according to a duty ratio control.

3. A hydraulic fluid pressure control device according to claim 1, wherein said oscillatory release of hydraulic fluid pressure is carried out according to a dither control.

4. A hydraulic fluid pressure control device according to claim 1, wherein said control hydraulic fluid pressure producing means is an elctromagnetic valve.

5. A hydraulic fluid pressure control device according to claim 1, wherein said torque distribution clutch has a pressure chamber, and said control hydraulic fluid pressure produced by said control hydraulic fluid pressure producing means is directly fed to said pressure chamber of said torque distribution clutch as an actuating hydraulic fluid pressure.

6. A hydraulic fluid pressure control device according to claim 1, wherein said torque distribution clutch has a pressure chamber, further comprising a hydraulic clutch control valve for receiving said control hydraulic fluid pressure from said control hydraulic fluid pressure producing means and a hydraulic fluid pressure from a source of hydraulic fluid pressure and producing an output hydraulic fluid pressure from said hydraulic fluid pressure received from said source of hydraulic fluid pressure, said output hydraulic fluid pressure being fed to said pressure chamber of said torque distribution clutch as an actuating hydraulic fluid pressure, the pressure magnitude of said output hydraulic fluid pressure varying according to the pressure magnitude of said control hydraulic fluid pressure.

7. A hydraulic fluid pressure control device according to claim 6, further comprising a means for producing a substantially constant hydraulic pressure, said substantially constant hydraulic pressure being supplied to said control hydraulic fluid pressure producing means to produce said control hydraulic fluid pressure.

8. A hydraulic fluid pressure control device according to claim 6, wherein said hydraulic clutch control valve varies the pressure magnitude of said output hydraulic fluid pressure substantially linearly with respect to the pressure magnitude of said control hydraulic fluid pressure at least over certain corresponding ranges thereof.

9. A hydraulic fluid pressure control device according to claim 8, wherein said hydraulic clutch control valve varies the pressure magnitude of said output hydraulic fluid pressure substantially linearly with respect to the pressure magnitude of said control hydraulic fluid pressure when said control hydraulic fluid pressure varies over a range from a relatively low pressure value up to a certain threshold pressure value; and, when said control hydraulic fluid pressure increases to be greater than said certain threshold pressure value, said hydraulic clutch control valve sets the pressure magnitude of said output hydraulic fluid pressure to be a maximum value.

10. A hydraulic fluid pressure control device according to claim 9, wherein said hydraulic clutch control valve provides said maximum value of said pressure magnitude of said output hydraulic fluid pressure to be substantially larger than a limit value to which said pressure magnitude of said output hydraulic fluid pressure approaches as said pressure magnitude of said control hydraulic fluid pressure approaches said certain threshold pressure value thereof.

* * * * *